(12) United States Patent
Watanabe et al.

(10) Patent No.: US 8,874,118 B2
(45) Date of Patent: Oct. 28, 2014

(54) BASE STATION, COMMUNICATION METHOD AND WIRELESS COMMUNICATION SYSTEM

(75) Inventors: Satoshi Watanabe, Yokohama (JP); Bun Kimura, Yokohama (JP); Tetsuo Tomita, Yokohama (JP); Masanori Hashimoto, Yokohama (JP)

(73) Assignee: Fujitsu Limited, Kawasaki (JP)

( * ) Notice: Subject to any disclaimer, the term of this patent is extended or adjusted under 35 U.S.C. 154(b) by 241 days.

(21) Appl. No.: 13/471,572

(22) Filed: May 15, 2012

(65) Prior Publication Data

US 2013/0023272 A1    Jan. 24, 2013

(30) Foreign Application Priority Data

Jul. 19, 2011    (JP) .................................. 2011-158273

(51) Int. Cl.
*H04W 36/08*    (2009.01)
*H04W 36/00*    (2009.01)

(52) U.S. Cl.
CPC ................................ *H04W 36/0083* (2013.01)
USPC .......................... 455/438; 455/436; 455/435.2

(58) Field of Classification Search
CPC ............................... H04W 36/83; H04W 36/61
USPC ........ 455/436, 438; 370/334, 436, 438, 435.2
See application file for complete search history.

(56) References Cited

U.S. PATENT DOCUMENTS

| | | | |
|---|---|---|---|
| 7,848,758 B1 * | 12/2010 | Sill et al. ..................... | 455/452.1 |
| 2005/0160179 A1 * | 7/2005 | Retana et al. ................. | 709/238 |
| 2008/0125125 A1 * | 5/2008 | Choi et al. .................... | 455/436 |
| 2008/0171553 A1 * | 7/2008 | Ren et al. ...................... | 455/450 |
| 2009/0047960 A1 * | 2/2009 | Gunnarsson et al. ......... | 455/436 |
| 2010/0046396 A1 * | 2/2010 | Cai et al. ...................... | 370/254 |
| 2010/0054155 A1 | 3/2010 | Cai et al. | |
| 2011/0110270 A1 * | 5/2011 | Leng et al. .................... | 370/254 |
| 2011/0130144 A1 * | 6/2011 | Schein et al. ................. | 455/442 |
| 2011/0159874 A1 | 6/2011 | Ninagawa | |
| 2011/0194482 A1 * | 8/2011 | Ji et al. ........................... | 370/315 |
| 2012/0028664 A1 * | 2/2012 | Zhang et al. .................. | 455/501 |
| 2012/0307697 A1 * | 12/2012 | Mukhopadhyay ............ | 370/311 |
| 2012/0329461 A1 * | 12/2012 | Teyeb et al. ................... | 455/437 |
| 2013/0070663 A1 * | 3/2013 | Gunnarsson et al. ......... | 370/315 |

FOREIGN PATENT DOCUMENTS

| | | |
|---|---|---|
| JP | 2010-056857 | 3/2010 |
| JP | 2010-524368 | 7/2010 |

OTHER PUBLICATIONS

3GPP TS 36.300 v10.3.0 (Mar. 2011); Technical Specification Group Radio Access Network; "4.7 Support for relaying".

* cited by examiner

*Primary Examiner* — Qun Shen
(74) *Attorney, Agent, or Firm* — Fujitsu Patent Center

(57) ABSTRACT

A base station, to which a cell belongs and which communicates with a relay node to which a relay node cell belongs, includes a control unit configured, at a time of handing over the relay node from the cell of the base station to a first cell belonging to a first base station, to extract information indicative of a non-overlapping cell between a first handover destination neighbor cell list containing neighbor cell information of a first neighbor cell adjacent to the first cell at a handover destination and a first handover source neighbor cell list containing neighbor cell information of a neighbor cell adjacent to the cell at a handover source, and to update a neighbor cell list corresponding to the non-overlapping cell by deleting the relay node cell belonging to the relay node from the neighbor cell list based on the information indicative of the non-overlapping cell.

6 Claims, 14 Drawing Sheets

FIG.7

| IE/Group Name | Presence | Semantics description |
|---|---|---|
| Message Type | M | A MESSAGE TYPE FOR IDENTIFYING A MESSAGE. |
| Handover Relay ID | M | AN IDENTIFICATION ID OF A RELAY NODE TRIGGERING THIS MESSAGE AND HAVING BEEN HANDED OVER PREVIOUSLY. |
| Direction | M | INDICATING WHETHER A SENDING DIRECTION IS FROM SOURCE TO TARGET OR FROM TARGET TO SOURCE. |
| Neighbour cell number | M | HEREINAFTER, THE NEIGHBOUR CELL LIST. THE NUMBER OF CELLS (INFORMATION PIECE) TO BE ADDED TO THE NEIGHBOUR CELL LIST. |
| >Neighbour Information | | NEIGHBOUR CELL INFORMATION (1 PIECE) |
| >>ECGI | M | E-UTRAN CELL GLOBAL ID OF NEIGHBOUR CELL |
| >>PCI | M | PHYSICAL CELL ID OF NEIGHBOUR CELL |
| >>EARFCN | M | DL EARFCN for FDD |

FIG.8

| IE/Group Name | Presence | Semantics description |
|---|---|---|
| Message Type | M | A MESSAGE TYPE FOR DISTINGUISHING A MESSAGE. |
| Handover Relay ID | M | AN IDENTIFICATION ID OF A RELAY NODE TRIGGERING THIS MESSAGE AND HAVING BEEN HANDED OVER PREVIOUSLY. |
| Delete Neighbour cell number | M | INDICATING THE NUMBER OF CELLS TO BE DELETED (IN CASE OF NO DELETION, 0) |
| >Neighbour Information | | NEIGHBOUR CELL INFORMATION (1 PIECE) TO BE DELETED |
| >>ECGI | M | E-UTRAN CELL GLOBAL ID OF NEIGHBOUR CELL |
| >>PCI | M | PHYSICAL CELL ID OF NEIGHBOUR CELL |
| >>EARFCN | M | DL EARFCN for FDD |

FIG.9

| IE/Group Name | Presence | Semantics description |
|---|---|---|
| Message Type | M | A MESSAGE TYPE FOR IDENTIFYING A MESSAGE. |
| Handover Relay ID | M | AN IDENTIFICATION ID OF A RELAY NODE TRIGGERING THIS MESSAGE AND HAVING BEEN HANDED OVER PREVIOUSLY. |
| Add Neighbour cell number | M | INDICATING THE NUMBER OF CELLS TO BE ADDED (IN CASE OF NO ADDITION, 0) |
| >Neighbour Information | | NEIGHBOUR CELL INFORMATION (1 PIECE) TO BE ADDED |
| >>ECGI | M | E-UTRAN CELL GLOBAL ID OF NEIGHBOUR CELL |
| >>PCI | M | PHYSICAL CELL ID OF NEIGHBOUR CELL |
| >>EARFCN | M | DL EARFCN for FDD |

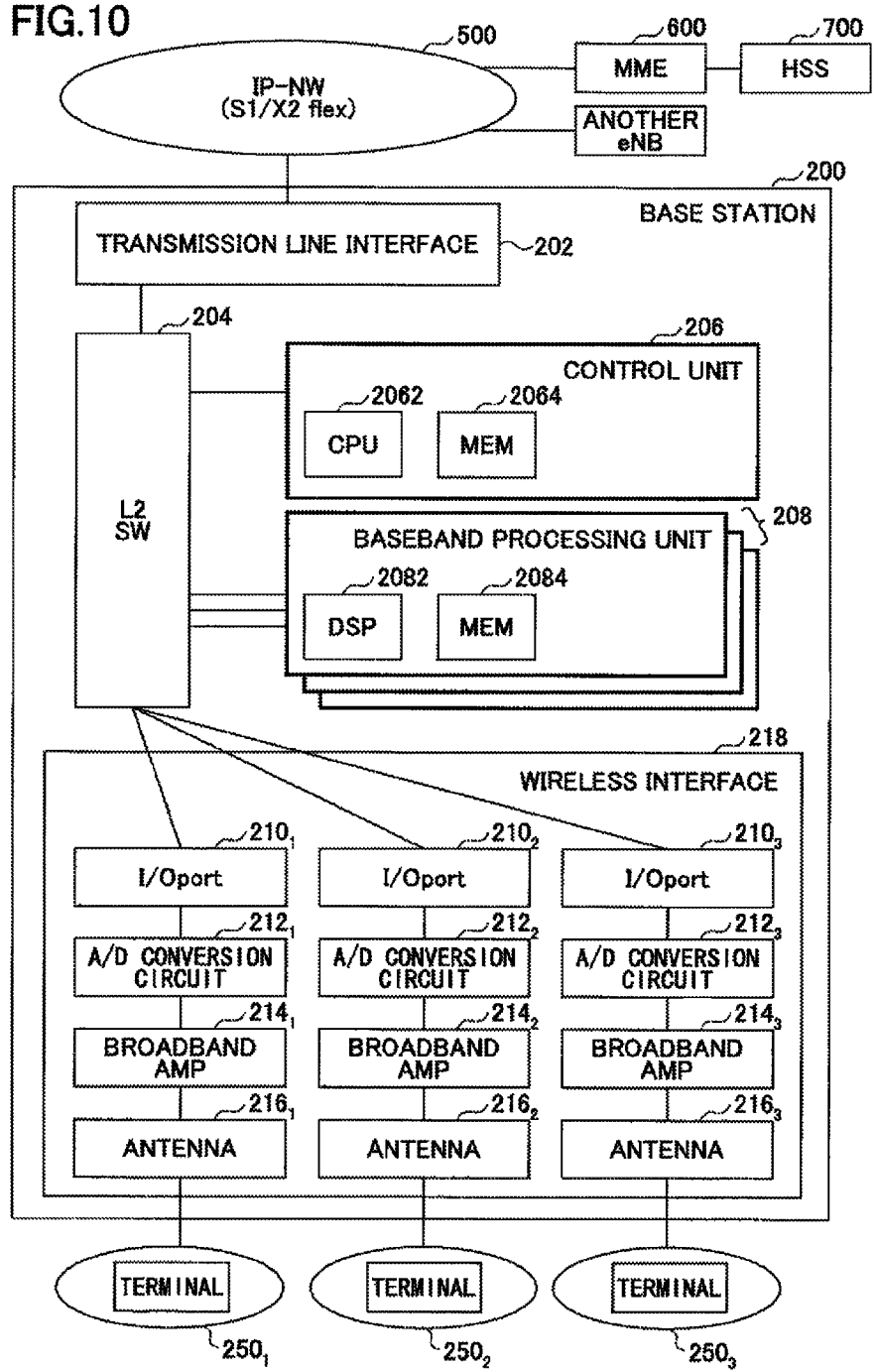

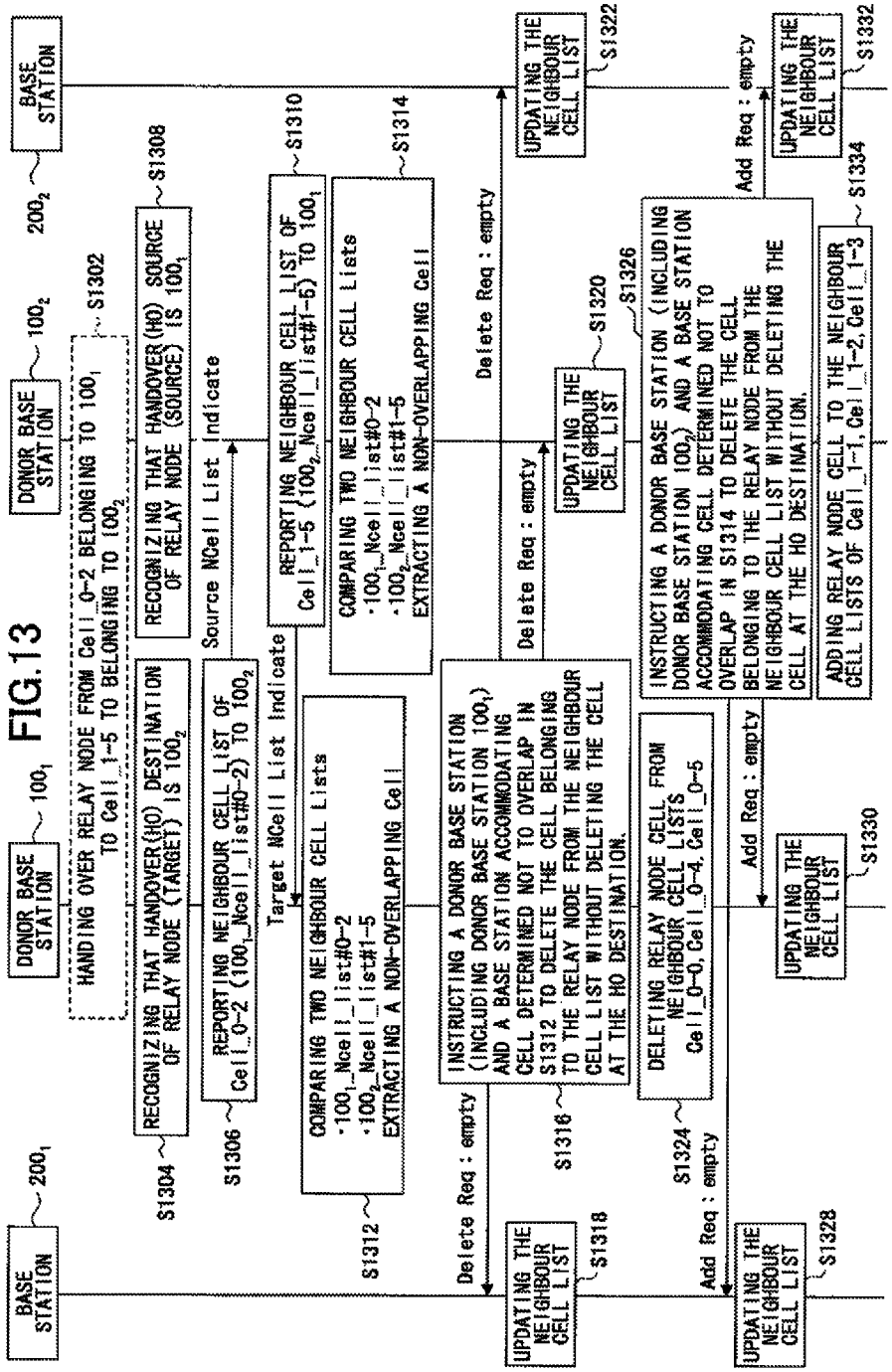

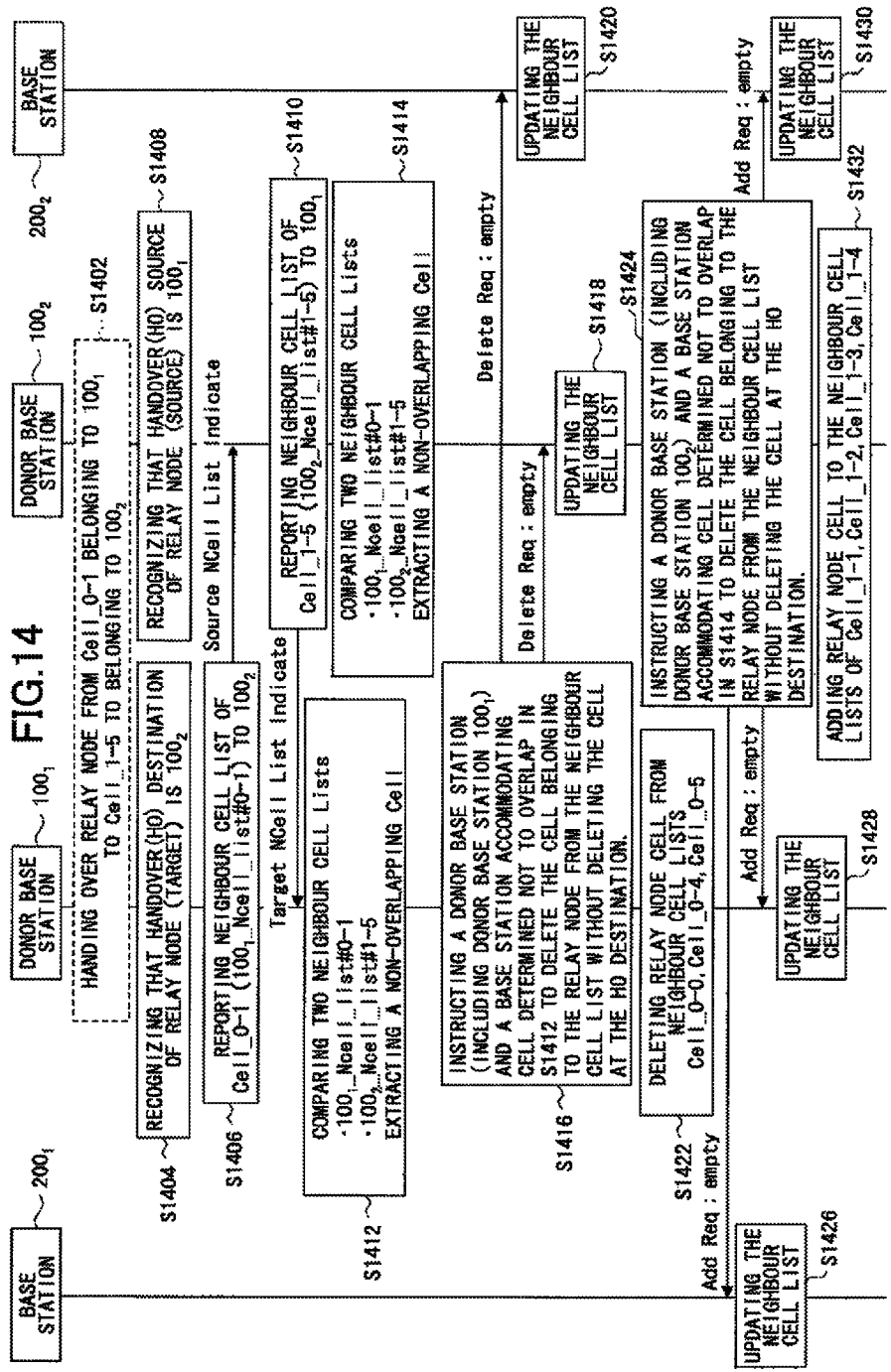

US 8,874,118 B2

BASE STATION, COMMUNICATION METHOD AND WIRELESS COMMUNICATION SYSTEM

CROSS-REFERENCE TO RELATED APPLICATIONS

This patent application is based upon and claims the benefit of priority of the prior Japanese Patent Application No. 2011-158273 filed on Jul. 19, 2011, the entire contents of which are incorporated herein by reference.

FIELD

The embodiments discussed herein are related to a wireless communication system.

BACKGROUND

As disclosed in "4.7 Support for relaying" 3GPP TS36.300, V10.3.0, 2011-03, in 3rd Generation Partnership Project (3GPP), a Relay Node (RN) is being studied for the purpose of improving the coverage of a network (hereinafter, referred to as a LTE network) performing wireless communication in conformity with Long Term Evolution (LTE) and expanding the capacity of the LTE network.

The relay node relays a communication with a wireless interface between a base station (eNode, hereinafter eNB) which performs wireless communications in conformity with LTE and a mobile terminal (User Equipment or UE, hereinafter referred to as a user terminal) corresponding to LTE.

The following is known about the relay node (see "4.7 Support for relaying" 3GPP TS36.300, V10.3.0, 2011-03, in 3rd Generation Partnership Project (3GPP)).

The relay node is connected to the network by a donor base station (Donor eNB: DeNB). The donor base station has an additional function of communicating while considering the relay nodes.

The relay node includes one cell. The one cell is independent from a cell included in the donor base station. The relay node terminates a Radio Resource Control (RRC) protocol so as to independently control the RRC protocol.

The relay node may be used in transportation such as a train and a small-sized area such as an event site. By enabling to utilize the relay node in the transportation and the small-sized area, a region accommodating communications and a capacity of accommodating the communications can be improved. The region of the cell covered by the relay node may be narrower than a region of a macrocell belonging to the base station or than a region of a macrocell belonging to the donor station.

SUMMARY

According to an aspect of the embodiment, a base station, to which a cell belongs and which communicates with a relay node to which a relay node cell belongs, includes a control unit configured, at a time of handing over the relay node from the cell of the base station to a first cell belonging to a first base station, to extract information indicative of a non-overlapping cell between a first handover destination neighbour cell list containing neighbour cell information of a first neighbour cell adjacent to the first cell at a handover destination and a first handover source neighbour cell list containing neighbour cell information of a neighbour cell adjacent to the cell at a handover source, and to update a neighbour cell list corresponding to the non-overlapping cell by deleting the relay node cell belonging to the relay node from the neighbour cell list based on the information indicative of the non-overlapping cell.

The object and advantages of the invention will be realized and attained by means of the elements and combinations particularly pointed out in the appended claims.

It is to be understood that both the foregoing general description and the following detailed description are exemplary and explanatory and are not restrictive of the invention, as claimed.

BRIEF DESCRIPTION OF THE DRAWINGS

FIG. 7 illustrates an exemplary neighbour cell list of the embodiment;
FIG. 8 illustrates first neighbour cell list changing information of the embodiment;
FIG. 9 illustrates second neighbour cell list changing information of the embodiment;
FIG. 10 is a block chart illustrating an exemplary base station of the embodiment;
FIG. 13 illustrates a first operation of a wireless communication system of the embodiment;
and
FIG. 14 illustrates a second operation of the wireless communication system of the embodiment.

DESCRIPTION OF EMBODIMENTS

A base station or a donor base station holds a list containing information indicative of cells adjacent to each cell belonging to the base station or the donor base station (hereinafter, referred to as a "neighbour cell list"). The user terminal uses a neighbour cell list at a time of the handover.

The neighbour cell list is reported from the base station or the donor station to the user terminal. The user terminal performs a circumjacent cell search based on the neighbour cell list.

Figure 1:
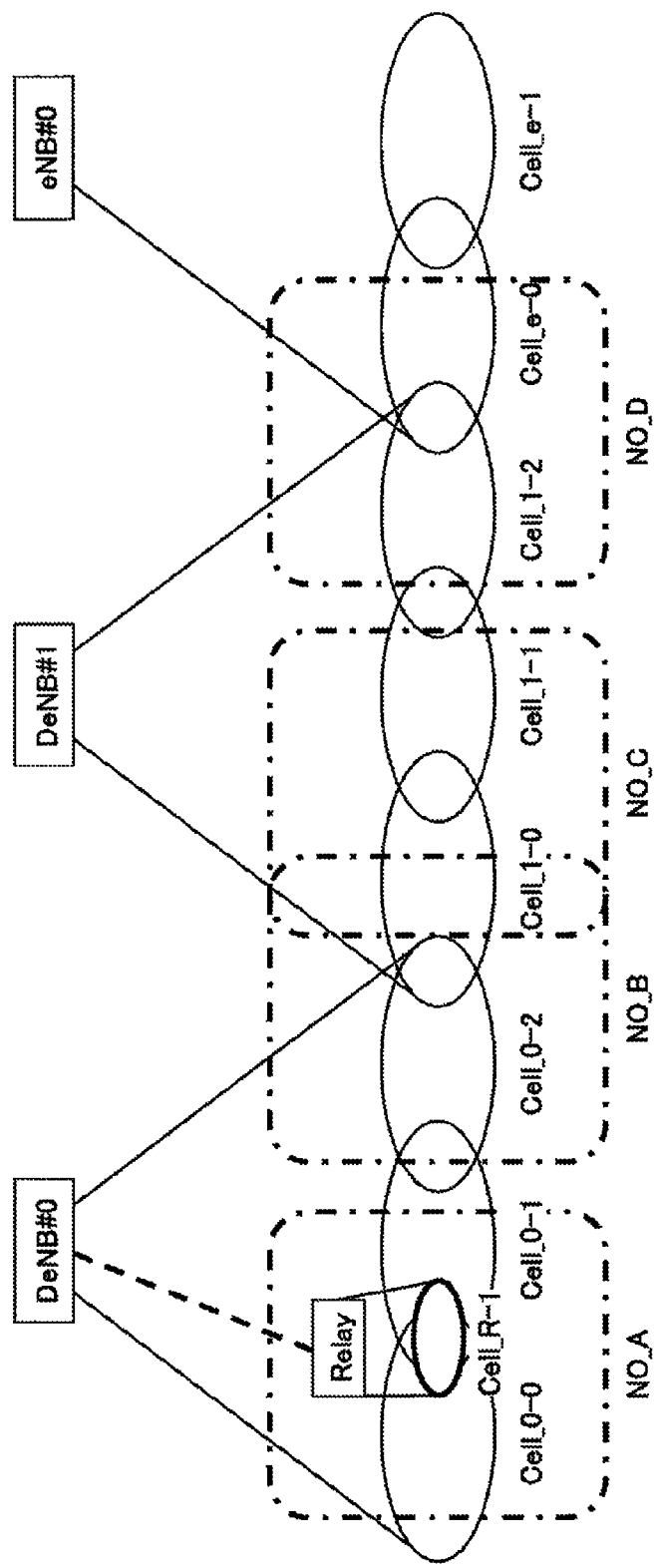
FIG. 1 illustrates an example of neighbour cells.
Figure 2:
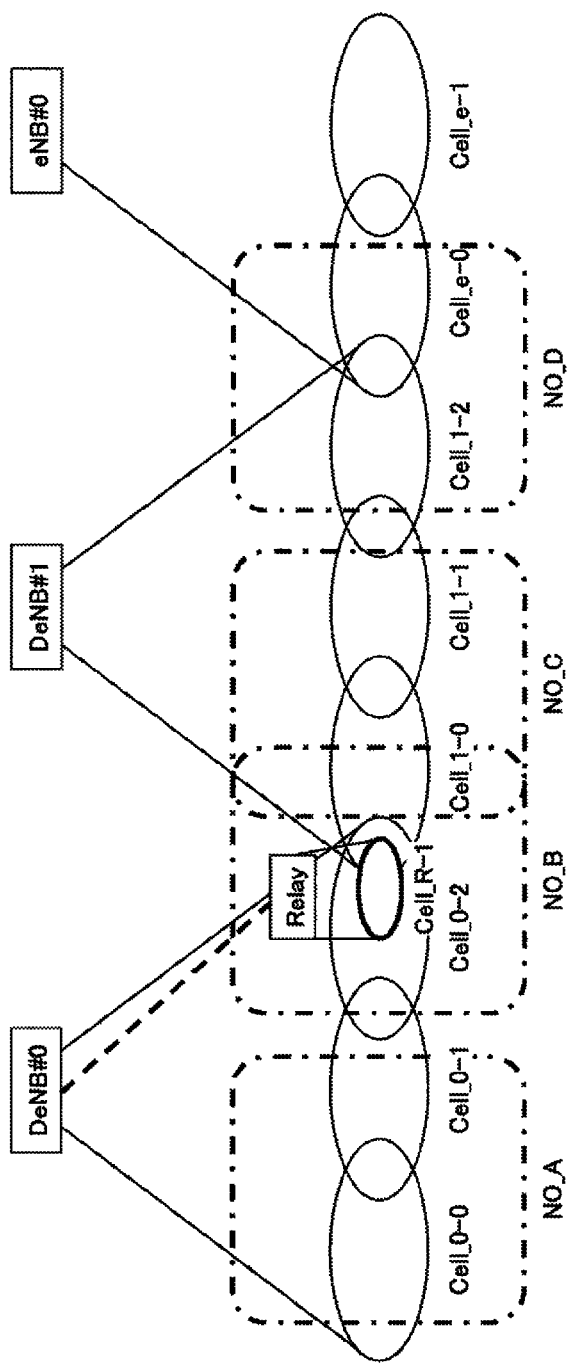
FIG. 2 illustrates another example of neighbour cells.

FIG. 1 and FIG. 2 illustrate an exemplary movement of a relay node.

The donor base station and the base station add information indicative of cells belonging to a relay node to the adjacent cell list. When the relay node moves, the cells belonging to the relay node move along with the movement of the relay node. The donor base station and the base station add the information indicative of the cells belonging to the relay node to the neighbour cell list or delete the information from the neighbour cell list.

Referring to FIG. 1, Cell_R-1 belonging to the relay node covers a region covered by Cell_0-0 belonging to a donor base station DeNB#0 (DeNB#0) and a region at least partly overlapping a region covered by Cell_0-1. Under this state, cells adjacent to Cell_0-0 of the donor base station DeNB #0 include Cell_0-1 and Cell_R-1. Cells adjacent to Cell_0-1 of the donor base station DeNB #0 include Cell_0-0 and Cell_R-

1. Cells adjacent to Cell_0-2 of the donor base station DeNB #0 include Cell_0-1 and Cell$_{13}$ 1-0.

FIG. 2 illustrates an example in which the state illustrated in FIG. 1 is shifted to a state in which the relay node is moved.

Referring to FIG. 2, Cell_R-1 belonging to the relay node covers a part of a region of Cell_0-2 of the donor base station DeNB#0. Under this state, cells adjacent to Cell_0-0 of the donor base station DeNB #0 include Cell_0-1. This is because, along with the movement of the relay node, information indicative of Cell_R-1 belonging to the relay node is deleted as not being the neighbour cell of Cell_0-0 of the donor base station DeNB#0. Under this state, cells adjacent to Cell_0-1 of the donor base station DeNB #0 include Cell_0-0. This is because, along with the movement of the relay node, information indicative of Cell_R-1 belonging to the relay node is deleted as not being the neighbour cell of Cell_0-1 of the donor base station DeNB#0. Cells adjacent to Cell_0-2 of the donor base station DeNB #0 include Cell_0-1, Cell$_{13}$ 1-0 and Cell_R-1. This is because, along with the movement of the relay node, information indicative of Cell_R-1 belonging to the relay node is added to as being the neighbour cell of Cell_0-2 of the donor base station DeNB#0.

Figure 3:
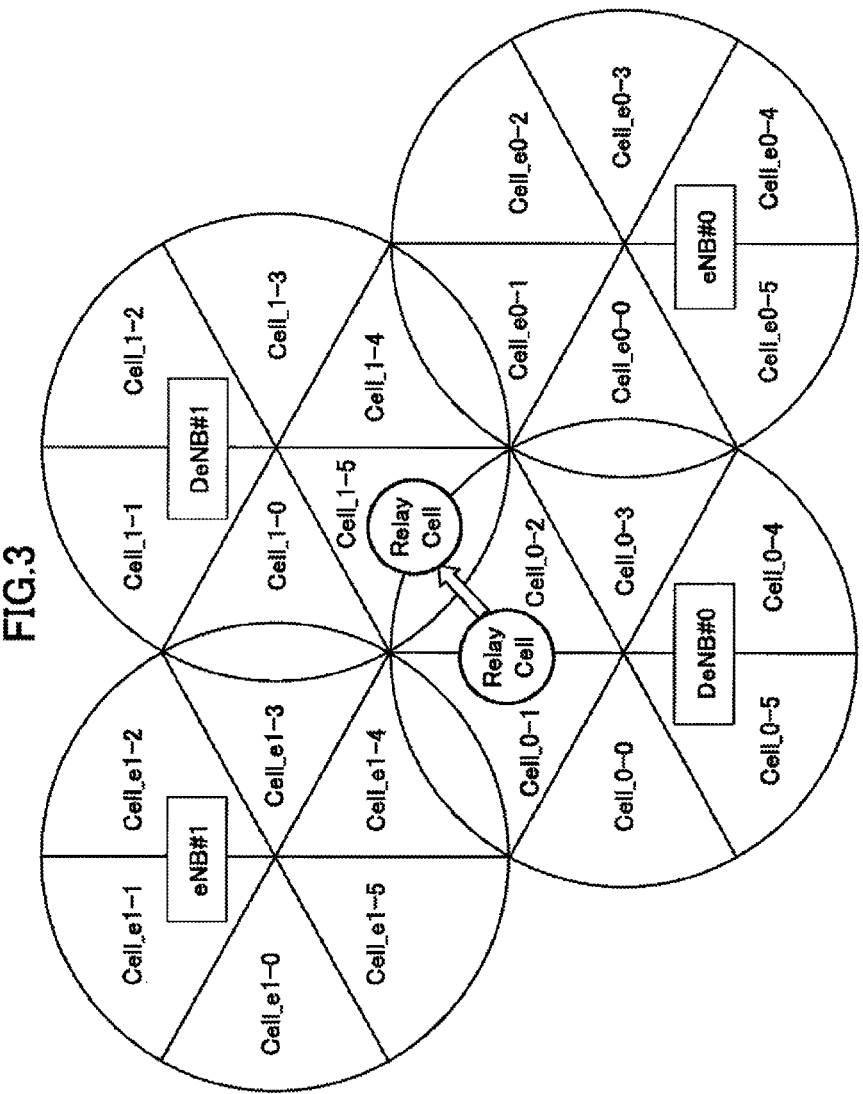
FIG. 3 illustrates an exemplary handover of relay nodes.

FIG. 3 illustrates detailed processes of adding information indicative of the cells belonging to the relay node to the neighbour cell list or deleting the information from the neighbour cell list along with the movement of the relay node.

Referring to FIG. 3, a cell (Relay Cell) belonging to the relay node moves from a region covered by Cell_0-2 belonging to the donor base station DeNB#0 to a region covered by Cell$_{13}$ 1-5 belonging to the donor base station DeNB#1. Said differently, the relay node is handed over from Cell_0-2 belonging to the donor base station DeNB#0 to Cell$_{13}$ 1-5 belonging to the donor base station DeNB#1.

When the relay node is handed over from Cell_0-2 belonging to the donor base station DeNB#0 to Cell$_{13}$ 1-5 belonging to the donor base station DeNB#1, the donor base station DeNB#0 at the handover source of the relay node instructs the donor base station and the base station, which accommodate the cell contained in the neighbour cell list of the Cell_0-2 belonging to the donor base station DeNB#0 to delete the cell belonging to the relay node.

Further, the donor base station DeNB#1 at the handover destination of the relay node reports to the donor base station and the base station which accommodate the cell contained in the neighbour cell list of Cell$_{13}$ 1-5 belonging to the donor base station DeNB#1 so as to add information of the cell belonging to the relay node to the neighbour cell list.

The process of deleting the information indicative of the cell belonging to the relay node from the above neighbour cell list and the process of adding the information indicative of the cell belonging to the relay node are assumedly performed also to cells adjacent to both of the cells at the handover source and the handover destination of the relay node. In this case, the donor base station and the base station, which accommodate the cell adjacent to both of the cells at the handover source and the handover destination of the relay node, are instructed so as to add the information indicative of the cell belonging to the relay node after being instructed to delete the information indicative of the cell belonging to the relay node from the neighbour cell list.

After deleting the information indicative of the cell belonging to the relay node, the process of adding the information indicative of the cell belonging to the relay node may not be performed.

Therefore, it is preferable to reduce the excessive process as such.

A description is given below, with reference to FIG. 1 to FIG. 14 and embodiments of the present invention. Through all figures, the same references symbols are used for portions having the same function and repetitive explanations of these portions are omitted.

<Wireless Communication System>

Figure 4:
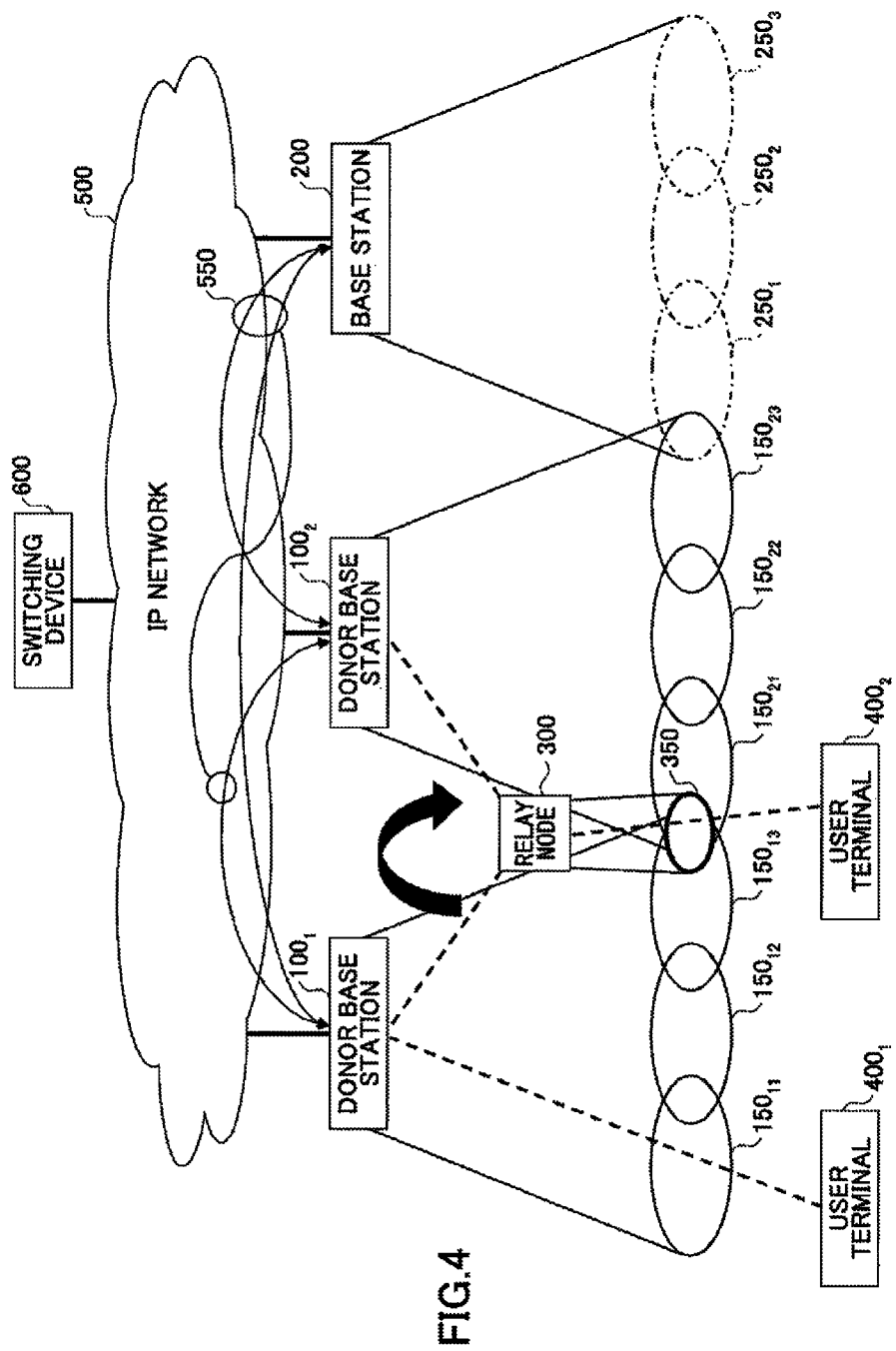
FIG. 4 illustrates an embodiment of a wireless communication system.

FIG. 4 illustrates an embodiment of a wireless communication system,

The wireless communication system includes a base station 200 performing a wireless communication in conformity with LTE. The base station 200 may be called "E-UTRAN Node-B". The base station provides E-UTRA U-Plane and C-Plane. When the U-Plane is provided, processes related to Packet Data Convergence Protocol (PDCP), Radio Link Control (RLC), Medium Access Control (MAC), and PHY are performed. When C-Plane is provided, a process related to RRC is performed. The base station 200 performs processes corresponding to Node-B of Universal Terrestrial Radio Access network (UTRAN) and RNC. The base station 200 covers cells $250_1$, $250_2$ and $250_3$. The base station 200 may cover one, two, four or more cells. Two or more base stations may be included in the wireless communication system.

The wireless communication system includes a donor base station $100_n$ (n is an integer satisfying n>0). FIG. 4 is an example in which n is 2. Donor base stations $100_1$ and $100_2$ have function of wireless communication with a relay node 300. The function of wireless communication with the relay node 300 is not provided in the base station 200. The donor base station $100_1$ covers cells $150_{11}$, $150_{12}$ and $150_{13}$. The donor base station $100_2$ covers cells $150_{21}$, $150_{22}$ and $150_{23}$. The donor base station $100_n$ may cover one, two, four or more cells. Three or more base stations may be included in the wireless communication system.

The wireless communication system may include a user terminal $400_m$ (m is an integer satisfying m>0) which performs a wireless communication in conformity with LTE. FIG. 4 is an example in which m is 2. For example, the user terminal $400_m$ performs wireless transmission in uplink in conformity with Single Carrier-Frequency Division Multiple Access (SC-FDMA). The user terminal 400m receives in downlink a wireless signal sent in conformity with Orthogonal Frequency Division Multiple Access (OFDMA).

The wireless communication system includes the relay node 300. The relay node 300 relays at least one of communications between the donor base stations $100_1$ and $100_2$ and the user terminals $400_1$ and $400_2$ in layer 3 of the Open Systems Interconnection (OSI) model. The number of the relay nodes may be plural. The relay node 300 performs demodulation and modulation of a wireless signal in downlink from the donor base station $100_1$ or $100_2$. Further, the relay node 300 reproduces user data and conceals, divides and integrates the reproduced user data, encodes and modulates the integrated user data and sends the encoded and modulated user data to the user terminal $400_1$ or $400_2$ with wireless transmission. The relay node 300 covers a relay node cell 350. In the example illustrated in FIG. 4, the relay node 300 covers with the relay node cell 350 a region in which a cell $150_{13}$ covered by the donor base station $100_1$ overlaps a cell $150_{21}$ covered by the donor base station $100_2$.

The wireless communication system includes a switching device 600. The switching device 600 may include a node administrating C-Plane and a node administrating U-Plane. The node administrating C-Plane may be called a "Mobility Management Entity" (MME). The node administrating C-Plane administrates mobile terminal context and stores this. The mobile terminal context includes a user identifier, a mobility state, security and so on. A node administrating U-Plane may be called a "Serving Gateway" (S-GW). The node administrating U-Plane administrates mobile terminal context and stores this. The mobile terminal context includes an IP bearer service parameter, routing information and so on.

The donor base stations $100_1$ and $100_2$, and the base station 200 are connected to the switching device 600 via an IP network 500.

An interface 550 connects the donor base stations $100_1$ and $100_2$ with the base station 200. The interface 550 also connects the donor base station $100_1$ and $100_2$ to the base station 200 and may be called "X2".

<Donor Base Station $100_n$>

Figure 5:
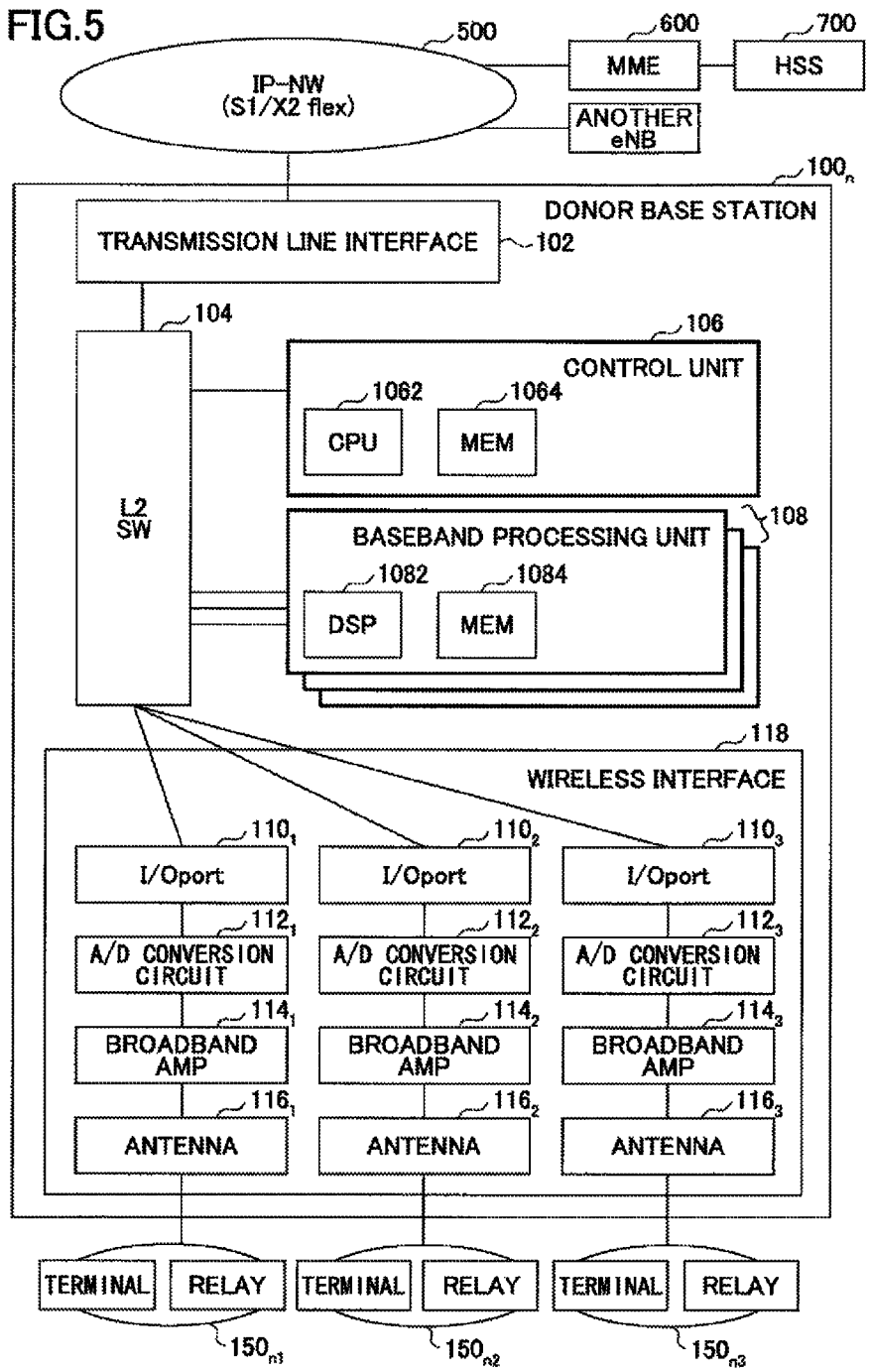
FIG. 5 is a block chart of an exemplary donor base station of the embodiment.

FIG. 5 illustrates an example of the donor base station $100_n$ of the embodiment.

FIG. 5 mainly illustrates a hardware structure.

The donor base station $100_n$ includes a transmission line interface 102, a layer 2 switch (L2SW) 104, a control unit 106, a baseband processing unit 108 and a wireless interface 118.

The wireless interface 118 includes wireless interface pieces proportional to the number of cells covered by the donor base station $100_n$. FIG. 5 illustrates an example in which three cells are covered by the donor base station $100_n$. In a case where the three cells are covered by the donor base station $100_n$, the wireless interface 118 includes input and output ports (I/O port) $110_1$ to $110_3$, A/D conversion circuits $112_1$ to $112_3$, broadband amplifiers (AMP) $114_1$ to $114_3$, and antennas $116_1$ to $116_3$. Suffixes "$_1$", "$_2$", "$_3$" . . . correspond to the cells, respectively.

The transmission line interface 102 interfaces donor base stations other than the donor base station $100_n$ including the transmission line interface 102 and the base station 200 with this donor base station $100_n$. The transmission line interface 102 interfaces the donor base station $100_n$ with the switching device 600. Referring to FIG. 5, the switching device 600 is designated by MME. The MME 600 is connected to a Home Subscriber Server (HSS) 700. The HSS 700 is a database of subscriber information. Further, the HSS 700 is used for administrating authentication information and existence information. The transmission line interface 102 may be called an "X2 interface".

The L2SW 104 is connected to the transmission line interface 102. The L2SW 104 determines a forwarding destination of a packet from the transmission line interface 102 in layer 2. The L2SW 104 transfers a packet from the transmission line interface 102 to an I/O port corresponding to a forwarding destination among input and output ports (I/O ports) $110_1$ to $110_3$ included in the wireless interface 118.

The control unit 106 is connected to the L2SW 104. The control unit 106 includes a CPU 1062 and a memory (MEM) 1064.

The CPU 1062 performs various controls in conformity with a program stored in the MEM 1064. The MEM 1064 stores a program for making the donor base station $100_n$ function as a donor base station $100_n$.

The control unit 106 performs call processing. The control unit 106 allocates IP addresses. Specifically, the IP address is allocated to the relay node 300. Further, the control unit 106 pools the IP address allocated to the relay node 300. Further, the control unit 106 performs resource control. Further, the control unit 106 controls a connection between the donor base station $100_n$ and the user terminal $400_m$. Further, the control unit 106 controls a connection between the donor base station $100_n$ and the user terminal $400_m$. Further, the control unit 106 controls a connection between the donor base station $100_n$ and the relay node 300. Further, the control unit 106 controls a connection between the donor base station $100_n$ and the relay node 300. Further, the control unit 106 instructs the relay node 300 to measure a receiving quality in downlink. Further, the control unit 106 analyzes the receiving quality in downlink reported from the relay node 300 in response to the instruction. Specifically, the control unit 106 determines whether the relay node 300 is handed over. Furthermore, the control unit 106 monitors and controls various portions of the donor base station $100_n$.

<Function of Donor Base Station $100_n$>

Figure 6:
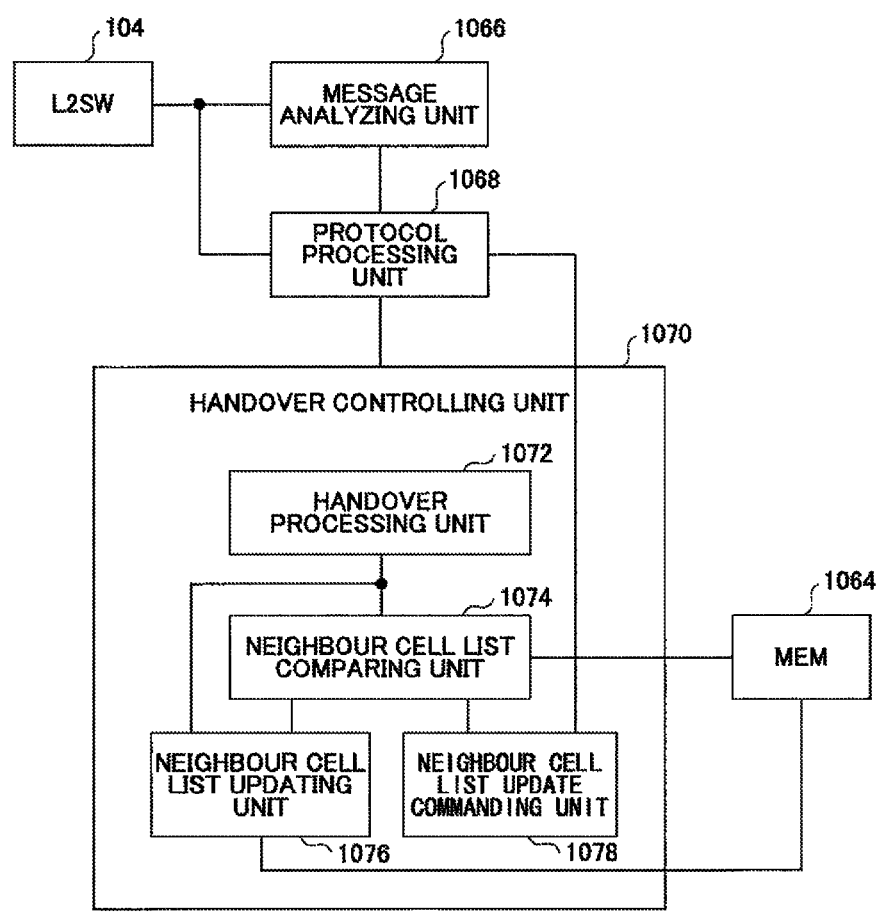
FIG. 6 is a functional block chart of an example of a donor base station of the embodiment.

FIG. 6 illustrates an example of the donor base station $100_n$ of the second embodiment.

The donor base station $100_n$ includes a message analyzing unit 1066, a protocol processing unit 1068 and a handover controlling unit 1070. The function of the message analyzing unit 1066, the function of the protocol processing unit 1068 and the function of the handover controlling unit 1070 are realized by the CPU 1062. When the CPU 1062 works in conformity with a predetermined program, the CPU 1062 functions as the message analyzing unit 1066, the protocol processing unit 1068 and the handover controlling unit 1070. The handover controlling unit 1070 includes a handover processing unit 1072, a neighbour cell list comparing unit 1074, a neighbour cell list updating unit 1076, and a neighbour cell list update commanding unit 1078. The CPU 1062 realizes the function of the handover processing unit 1072, the function of the neighbour cell list comparing unit 1074, the function of the neighbour cell list updating unit 1076 and the function of the neighbour cell list update commanding unit 1078. When the CPU 1062 works in conformity with a predetermined program, the CPU 1062 functions as the handover processing unit 1072, the neighbour cell list comparing unit 1074, the neighbour cell list updating unit 1076 and the function of the neighbour cell list update commanding unit 1078.

The message analyzing unit 1066 is connected to the L2SW 104. The message analyzing unit 1066 analyzes a message received from the L2SW 104. Specifically, the message analyzing unit 1066 sends the message to the L2SW 104 if the destination of the message is the user terminal $400_m$ or the relay node 300. Further, the message analyzing unit 1066 sends the message to the protocol processing unit 1068 so as to be received by the protocol processing unit 1068 in a case where the message is information indicative of wireless quality in downlink from the relay node 300, a neighbour cell list from another donor base station or neighbour cell list changing information from the other donor base station. The neighbour cell list changing information is described later.

The protocol processing unit 1068 is connected to the L2SW 104 and the message analyzing unit 1066. The protocol processing unit 1068 sends information indicative of the wireless quality in downlink from the message analyzing unit 1070 to the handover controlling unit 1066. Further, the protocol processing unit 1068 makes the handover controlling unit 1070 input neighbour cell list changing information from the message analyzing unit 1066. Further, the protocol processing unit 1068 performs protocol conversion for sending the neighbour cell list to be reported to the relay node 300 belonging to the donor base station $100_n$. The neighbour cell list is included in an X2 message. Further, the protocol processing unit 1068 performs protocol conversion for sending the neighbour cell list to be reported to the donor base station to which the cell at the handover destination belongs when the relay node 300 is handed over. The neighbour cell list is included in an X2 message.

FIG. 7 illustrates an exemplary neighbour cell list of the embodiment.

The neighbour cell list includes Message Type, Handover Relay ID, Direction, and Neighbour cell number.

Message type indicates an identifier for distinguishing the message. Handover Relay ID indicates an identification ID of the relay node triggering the message and having been handed over previously. Direction indicates whether a sending direction is from Source to Target or from Target to Source. Said differently, Direction indicates whether the message is sent from the donor base station at the handover source to another donor base station at the handover destination or the message is sent from the other donor base station at the handover destination to the donor base station at the handover source. Neighbour cell number indicates the number of cells (the information) contained in the neighbour cell list.

The neighbour cell list includes neighbour cell information pieces corresponding to the number of neighbour cells. The neighbour cell information includes an E-UTRAN cell global ID (ECGI: E-UTRAN Cell Global ID), a physical cell ID (PCI: Physical Cell Identities), and EARFCN. ECGI represents a global ID of the E-UTRAN cell global ID. PCI stands for physical cell ID. PCI relates to the neighbour cell. EARFCN stands for E-UTRAN Absolute Radio Frequency Channel Number. EARFCN relates to Frequency Division Duplex (FDD) in downlink.

The protocol processing unit 1068 performs protocol conversion for sending neighbour cell list changing information generated based on the neighbour cell list of the cell at the handover destination reported from the donor base station and a neighbour cell list corresponding to the cell at the handover source among the cells belonging to the donor base station $100_n$ when the relay node 300 existing in the cell belonging to the donor base station $100n$ is handed over to the cell belonging to the other donor base station. The neighbour cell list is included in an X2 message.

FIG. 8 illustrates first neighbour cell list changing information as an example. The neighbour cell list illustrated in FIG. 8 is sent mainly by the donor base station at the handover source.

The neighbour cell list changing information includes Message type, Handover Relay ID and Delete Neighbour cell number. Message type indicates an identifier for distinguishing the message. Handover Relay ID indicates an identification ID of the relay node triggering the message and having been handed over previously. Delete Neighbour cell number indicates the number of cells to be deleted from the neighbour cell list. Further, the neighbour cell list changing information further includes neighbour cell information pieces corresponding to the number of neighbour cells to be deleted. The neighbour cell information includes ECGI, PCI and EARFCN. ECGI indicates a global ID of the neighbour cell of E-UTRAN cell. PCI stands for physical cell ID. PCI relates to the neighbour cell. EARFCN relates to FDD in downlink.

The protocol processing unit 1068 performs protocol conversion for sending neighbour cell list changing information generated based on the neighbour cell list of the cell at the handover source reported from the donor base station and a neighbour cell list corresponding to the cell at the handover destination among the cells belonging to the donor base station $100_n$ when the relay node 300 existing in the cell belonging to the donor base station $100n$ is handed over from the cell belonging to the other donor base station.

FIG. 9 illustrates second neighbour cell list changing information as an example. The neighbour cell list illustrated in FIG. 9 is sent mainly by the donor base station at the handover destination.

The neighbour cell list changing information includes Message type, Handover Relay ID and Add Neighbour cell number. Message type indicates a message type for distinguishing the message, i.e., an identifier. Handover Relay ID indicates an identification ID of the relay node triggering the message and having been handed over previously. Add Neighbour cell number indicates the number of cells to be added to the neighbour cell list. Further, the neighbour cell list changing information further includes neighbour cell information pieces corresponding to the number of neighbour cells to be added. The neighbour cell information includes ECGI, PCI and EARFCN. ECGI indicates a global ID of the E-UTRAN cell of the neighbour cell. PCI stands for physical cell ID. PCI relates to the neighbour cell. EARFCN relates to FDD in downlink.

The handover controlling unit 1070 controls handover of the relay node 300 existing in a cell belonging to a donor base station $100_n$ to a cell belonging to another donor base station. The handover controlling unit 1070 controls handover of the relay node 300 from a cell belonging to the other donor station to a cell belonging to the donor station $100_n$.

The handover processing unit 1072 is connected to the protocol processing unit 1068. The handover processing unit 1072 determines whether the relay node 300, which has sent information indicative of the wireless quality in downlink, is handed over to the other donor base station base on a wireless quality in downlink to be input by the protocol processing unit 1068.

The handover processing unit 1072 processes to hand over the relay node 300 to and from the other donor base station. The handover processing unit 1072 reports that the handover is performed to the neighbour cell list comparing unit 1074 at a time of handing over the relay node 300 between the handover processing unit 1072 and the other donor base station.

Further, the handover processing unit 1072 sends neighbour cell list update information sent from the other donor base station so that the neighbour cell list updating unit 1076 receives the neighbour cell list update information when the above handover is performed to the neighbour cell list updating unit 1076.

The neighbour cell list comparing unit 1074 is connected to the handover processing unit 1072. The neighbour cell list comparing unit 1074 is connected to the handover processing unit 1072 and the memory 1064. When the relay node 300 is handed over between the donor base station $100_n$ and another donor base station, the neighbour cell list corresponding to the cell at the handover destination from the other donor base station or the neighbour cell list corresponding to the cell at the handover source is input from the handover processing unit 1072 to the neighbour cell list comparing unit 1074. The neighbour cell list comparing unit 1074 compares information indicative of the cell contained in the neighbour cell list of the donor base station $100_n$ stored in the memory (MEM) 1064 and information indicative of the cell contained in the neighbour cell list of the other donor station.

<Case where the Cell at the Handover Source Belongs to the Donor Base Station>

The neighbour cell list corresponding to the cell at the handover destination is input from the donor base station $100_n$ and the other donor base station performing the handover to the neighbour cell list comparing unit 1074. The neighbour cell list comparing unit 1074 extracts information indicative of a cell which does not overlap by comparing the neighbour cell list corresponding to the cell at the handover destination and the neighbour cell list which corresponds to the cell at the handover source of the relay node 300 and is to be stored in the memory (MEM) 1064. Specifically, the information indicative of the cell which does not overlap the cell contained in the neighbour cell list corresponding to the handover destination is extracted from the cells contained in the neighbour cell list which corresponds to the cell at the handover source of the relay node 300 and is to be stored in the memory (MEM) 1064. When the information indicative of the cell at the handover destination is contained in the information indicative of a cell which does not overlap, the information of the cell at the handover destination is deleted from the information indicative of the cell which does not overlap. The neighbour cell list comparing unit 1074 inputs the information indicative of the cell which does not overlap (hereiafter, referred to as "non-overlapping cell information") to the neighbour cell list updating unit 1076 and the neighbour cell list update commanding unit 1078.

<Case where the Cell at the Handover Destination Belongs to the Donor Base Station>

The neighbour cell list corresponding to the cell at the handover source is input from the donor base station 100$_n$ and the other donor base station performing the handover to the neighbour cell list comparing unit 1074. The neighbour cell list comparing unit 1074 extracts information indicative of a cell which does not overlap by comparing the neighbour cell list corresponding to the cell at the handover destination and the neighbour cell list which corresponds to the cell at the handover source of the relay node 300 and is to be stored in the memory (MEM) 1064. Specifically, the information indicative of the cell which does not overlap the cell contained in the neighbour cell list corresponding to the handover destination is extracted from the cells contained in the neighbour cell list which corresponds to the cell at the handover source of the relay node 300 and is to be stored in the memory (MEM) 1064. When the information indicative of the cell at the handover source is contained in the information indicative of the cell which does not overlap, the information of the cell at the handover destination is deleted from the information indicative of the cell which does not overlap. The neighbour cell list comparing unit 1074 inputs the non-overlapping cell information to the neighbour cell list updating unit 1076 and the neighbour cell list update commanding unit 1078.

The neighbour cell list updating unit 1076 is connected to the memory (MEM) 1064, the handover processing unit 1072, and the wireless quality measurement requesting unit 1074. The neighbour cell list updating unit 1076 updates the neighbour cell list to be stored in the memory (MEM) 1064. The neighbour cell list updating unit 1076 updates the neighbour cell list to be stored in the memory (MEM) 1064.

<Case where the Donor Base Station Includes the Cell at the Handover Source>

The neighbour cell list updating unit 1076 determines whether the cell belonging to the donor base station is contained in the non-overlapping cell information which is input by the neighbour cell list comparing unit 1074. When the non-overlapping cell information includes a cell belonging to the donor base station, the information indicative of the cell belonging to the relay node 300 is deleted from the neighbour cell information corresponding to the cell belonging to the donor base station contained in the non-overlapping cell information among neighbour cell lists which correspond to the cells and are to be stored in the memory (MEM) 1064.

The neighbour cell list updating unit 1076 determines whether the cell belonging to the donor base station is contained in the neighbour cell list update information which is input by the handover processing unit 1072. When the neighbour cell list update information contains the cell belonging to the donor base station, the information indicative of the cell belonging to the relay node 300 is added to the neighbour cell information corresponding to the cell belonging to the donor base station contained in the neighbour cell list update information among the neighbour cell lists which correspond to the cells and are to be stored in the memory (MEM) 1064.

<Case where the Donor Base Station Includes the Cell at the Handover Destination>

The neighbour cell list updating unit 1076 determines whether the cell belonging to the donor base station is contained in the neighbour cell list update information which is input by the handover processing unit 1072. When the neighbour cell list update information contains a cell belonging to the donor base station, the information indicative of the cell belonging to the relay node 300 is added to the neighbour cell list corresponding to the cell contained in the neighbour cell list update information among the neighbour cell lists which correspond to the cells and are to be stored in the memory (MEM) 1064.

The neighbour cell list updating unit 1076 determines whether the cell belonging to the donor base station is contained in the neighbour cell list update information which is input by the handover processing unit 1072. When the neighbour cell list update information contains the cell belonging to the donor base station, the information indicative of the cell belonging to the relay node 300 is deleted from the neighbour cell information corresponding to the cell belonging to the donor base station contained in the neighbour cell list update information among the neighbour cell lists which correspond to the cells and are to be stored in the memory (MEM) 1064.

The neighbour cell list update commanding unit 1078 is connected to the protocol processing unit 1068 and the neighbour cell list comparing unit 1074. The neighbour cell list update commanding unit 1078 generates the neighbour cell list update information for requesting an update of the neighbour cell list in at least one of a donor base station other than the donor base station and the base station 200 based on the non-overlapping cell information to be input by the neighbour cell list comparing unit 1074. The neighbour cell list update commanding unit 1078 sends the neighbour cell list update information to the protocol processing unit 1068 so that the protocol processing unit 1068 receives the neighbour cell list update information. The protocol processing unit 1068 performs protocol conversion for sending the neighbour cell list update information as an X2 message.

<Case where the Donor Base Station Includes the Cell at the Handover Source>

The neighbour cell list update commanding unit 1078 generates neighbour cell list update information containing information for requesting deletion of information indicative of the cell belonging to the relay node 300 from the neighbour cell list of the cell contained in the non-overlapping cell in at least one of the donor base station and the base station which contain the cell contained in the non-overlapping cell information input by the neighbour cell list comparing unit 1074.

<Case where the Donor Base Station Includes the Cell at the Handover Destination>

The neighbour cell list update commanding unit 1078 generates neighbour cell list update information containing information for requesting addition of information indicative of the cell belonging to the relay node 300 to the neighbour cell list of the cell contained in the non-overlapping cell in at least one of the donor base station and the base station which contain the cell contained in the non-overlapping cell information input by the neighbour cell list comparing unit 1074.

The baseband processing unit 108 is connected to the L2SW 104. The baseband processing unit 108 includes a digital signal processor (DSP) 1082 and a memory (MEM) 1084.

The DSP 1082 performs various controls in conformity with the program stored in the MEM 1084. The MEM 1084 stores a program for making the donor base station 100$_n$ function as a donor base station.

The baseband processing unit 108 sends and receives information to and from the control unit 106. The baseband processing unit 108 administrates traffic. Specifically, the baseband processing unit 108 administrates General Packet Radio Service (GPRS) Tunnelling Protocol (GTP). The baseband processing unit 108 administrates a transfer of the traffic. Specifically, GTP is administrated. The baseband processing unit 108 monitors traffic (e.g., traffic volume of data). Specifically, conditions of cells are monitored. The baseband processing unit 108 performs setup of concealment and release of the concealment. Further, the baseband processing unit 108 administrates MAC multiplexing and MAC demultiplexing. Further, the baseband processing unit 108 performs synchronous processing. Further, the baseband processing unit 108 performs paging.

The wireless interface 118 is connected to the L2SW 104.

The I/O ports $110_1$ to $110_3$ are connected to the L2SW 104. The I/O ports $110_1$ to $110_3$ are input and output ports.

A/D conversion circuits $112_1$ to $112_3$ are connected to the I/O ports $110_1$ to $110_3$, respectively. The A/D conversion circuits $112_1$ to $112_3$ convert analog signals from the I/O ports $110_1$ to $110_3$ to digital signals, respectively.

Broadband amplifiers (broadband AMPs) $114_1$ to $114_3$ are connected to the A/D conversion circuits $112_1$ to $112_3$, respectively. The broadband AMPs $114_1$ to $114_3$ amplify the digital signals from the A/D conversion circuits $112_1$ to $112_3$, respectively.

The antennas $116_1$ to $116_3$ are connected to the broadband AMPs $114_1$ to $114_3$, respectively. The antennas $116_1$ to $116_3$ wirelessly send signals from the broadband AMPs $114_1$ to $114_3$, respectively. The wireless signals sent from the antennas $116_1$ to $116_3$ are sent to at least one of the user terminal $400_m$ and the relay node 300 existing in the corresponding cell.

<Base Station>

FIG. 10 illustrates an exemplary base station 200 of the embodiment.

FIG. 10 mainly illustrates a hardware structure.

The base station 200 includes a transmission line interface 202, a layer 2 switch (L2SW) 204, a control unit 206, a baseband processing unit 208 and a wireless interface 218.

The wireless interface 218 includes wireless interface pieces proportional to the number of cells covered by the base station 200. FIG. 10 illustrates an example in which three cells are covered by the base station 200. In a case where the three cells are covered by the base station 200, the wireless interface 218 includes input and output ports (I/O port) $210_1$ to $210_3$, A/D conversion circuits $212_1$ to $212_3$, broadband amplifiers (AMP) $214_1$ to $214_3$, and antennas $216_1$ to $216_3$. Suffixes "$_1$", "$_2$", "$_3$" ... correspond to the cells, respectively.

The transmission line interface 202 interfaces base stations and donor base stations other than the base station 200 including the transmission line interface 202 with the base station 200. The transmission line interface 202 interfaces the base station 200 with the switching device 600. Referring to FIG. 10, the switching device 600 is designated by MME. The MME 600 is connected to a Home Subscriber Server (HSS) 700. The HSS 700 is a database of subscriber information. Further, the HSS 700 is used for administrating authentication information and existence information. The transmission line interface 202 may be called an "X2 interface".

The L2SW 204 is connected to the transmission line interface 202. The L2SW 204 determines a forwarding destination of a packet from the transmission line interface 202 in layer 2 of the Open Systems Interconnection (OSI) model. The L2SW 204 transfers a packet from the transmission line interface 202 to an I/O port corresponding to a forwarding destination among input and output ports (I/O ports) $110_1$ to $110_3$ included in the wireless interface 218.

The control unit 206 is connected to the L2SW 204. The control unit 206 includes a CPU 2062 and a memory (MEM) 2064.

The CPU 2062 performs various controls in conformity with a program stored in the MEM 2064. The MEM 2064 stores a program causing the base station 200 to function as a LTE base station.

The control unit 206 performs call processing. Further, the control unit 206 performs resource control. Further, the control unit 206 controls a connection between the base station 200 and a user terminal $400_m$. Further, the control unit 206 controls a connection between the base station 200 and a user terminal $400_m$. Further, the control unit 206 instructs the user terminal $400_m$ to measure a receiving quality in downlink. Further, the control unit 206 analyzes the receiving quality in downlink reported from the user terminal $400_m$ in response to the instruction. Specifically, the control unit 206 determines whether the user terminal $400_m$ is handed over. Furthermore, the control unit 206 monitors and controls various portions of the base station 200.

<Function of Base Station 200>

Figure 11:
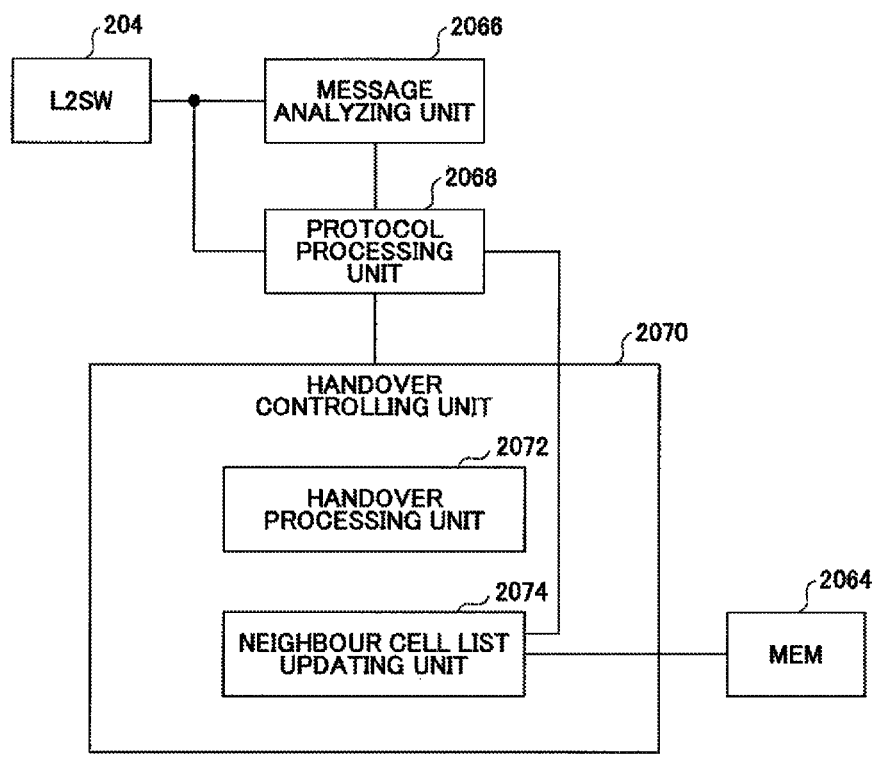
FIG. 11 is a functional block chart of the exemplary base station of the embodiment.

FIG. 11 illustrates an exemplary operation of the base station 200 of the embodiment.

The base station 200 includes a message analyzing unit 2066, a protocol processing unit 2068 and a handover controlling unit 2070. The function of the message analyzing unit 2066, the function of the protocol processing unit 2068 and the function of the handover controlling unit 2070 are realized by the CPU 2062. When the CPU 2062 works in conformity with a predetermined program, the CPU 2062 functions as the message analyzing unit 2066, the protocol processing unit 2068 and the handover controlling unit 2070. The handover controlling unit 2070 includes a handover processing unit 2072 and a neighbour cell list updating unit 2074. The function of the handover processing unit 2072 and the function of the neighbour cell list updating unit 2074 are realized by the CPU 2062. When the CPU 2062 works in conformity with the predetermined program, the CPU 2062 functions as the handover processing unit 2072 and the neighbour cell list updating unit 2074.

The message analyzing unit 2066 is connected to the L2SW 204. The message analyzing unit 2066 analyzes a message received from the L2SW 204. Specifically, the message analyzing unit 2066 sends the message to the L2SW 204 if the destination of the message is the user terminal $400_m$. Further, the message analyzing unit 2066 sends the message to the protocol processing unit 2068 if the message contains information indicative of a wireless quality from the user terminal $400_m$ in downlink or neighbour cell list changing information from the donor base station so that the message is received by the protocol processing unit 2068.

The protocol processing unit 2068 is connected to the L2SW 204 and the message analyzing unit 2066. The protocol processing unit 2068 sends information indicative of the wireless quality in downlink from the message analyzing unit 2066 to the handover controlling unit 2070. Further, the protocol processing unit 2068 makes the handover controlling unit 2070 input neighbour cell list changing information from the message analyzing unit 2066.

The handover controlling unit 2070 controls handover of the user terminal $400_m$ belonging to the base station 200 to the donor base station or a base station other than the base station including the handover controlling unit 2070. Further, the handover controlling unit 2070 controls handover of the user terminal $400_m$ from the donor base station and the other base station to the base station 200 including the handover controlling unit 2070.

The handover processing unit 2072 is connected to the protocol processing unit 2068. The handover processing unit 2072 determines whether the user terminal $400_m$, which has sent information indicative of the wireless quality in downlink, is handed over to the donor base station or the other base station base on the wireless quality in downlink to be input by the protocol processing unit 2068.

The handover processing unit 2072 processes to hand over the user terminal $400_m$ between the base station including the handover controlling unit 2070 and the donor base station or the other base station.

The neighbour cell list updating unit 2074 is connected to the protocol processing unit 2068. The neighbour cell list updating unit 2074 determines whether the cell belonging to the base station is contained in the neighbour cell list update information which is input by the protocol processing unit 2068. When the neighbour cell list update information contains the cell belonging to the base station, the information indicative of the cell belonging to the relay node 300 is added to or deleted from the neighbour cell information corresponding to the cell belonging to the base station contained in the neighbour cell list update information among the neighbour cell lists which correspond to the cells and are to be stored in the memory (MEM) 2064. Specifically, in a case where the neighbour cell list update information is sent from the donor base station at the handover source, the information indicative of the cell belonging to the relay node is deleted. In a case where the neighbour cell list update information is sent from the donor base station at the handover destination, the information indicative of the cell belonging to the relay node is added. It is designated by "deleting neighbour cell number" or "adding neighbour cell number" of the neighbour cell list update information whether the information is deleted or added.

The baseband processing unit 208 is connected to the L2SW 204. The baseband processing unit 208 includes a digital signal processor (DSP) 2082 and a memory (MEM) 2084.

The DSP 2082 performs various controls in conformity with a program stored in the MEM 2084. The MEM 2084 stores the program causing the base station 200 to properly function as a base station.

The baseband processing unit 208 sends and receives information to and from the control unit 206. The baseband processing unit 208 monitors traffic (e.g., traffic volume of data). Specifically, conditions of cells are monitored. The baseband processing unit 208 performs setup of concealment and release of the concealment. Further, the baseband processing unit 208 administrates MAC multiplexing and MAC demultiplexing. Further, the baseband processing unit 208 performs synchronous processing. Further, the baseband processing unit 208 performs paging.

The wireless interface 218 is connected to the L2SW 204.

The I/O ports $210_1$ to $210_3$ are connected to the L2SW 204. The I/O ports $210_1$ to $210_3$ are input and output ports.

A/D conversion circuits $212_1$ to $212_3$ are connected to the I/O ports $210_1$ to $210_3$, respectively. The A/D conversion circuits $212_1$ to $212_3$ convert analog signals from the I/O ports $210_1$ to $210_3$ to digital signals, respectively.

Broadband amplifiers (broadband AMPs) $214_1$ to $214_3$ are connected to the A/D conversion circuits $212_1$ to $212_3$, respectively. The broadband AMPs $214_1$ to $214_3$ amplify the digital signals from the A/D conversion circuits $212_1$ to $212_3$, respectively.

The antennas $216_1$ to $216_3$ are connected to the broadband AMPs $214_1$ to $214_3$, respectively. The antennas $216_1$ to $216_3$ wirelessly send signals from the broadband AMPs $214_1$ to $214_3$, respectively. Wireless signals from the antennas $216_1$ to $216_3$ are sent to the user terminal $400_m$ existing in the corresponding cell.

<First Operation of the Wireless Communication System>

Figure 12:
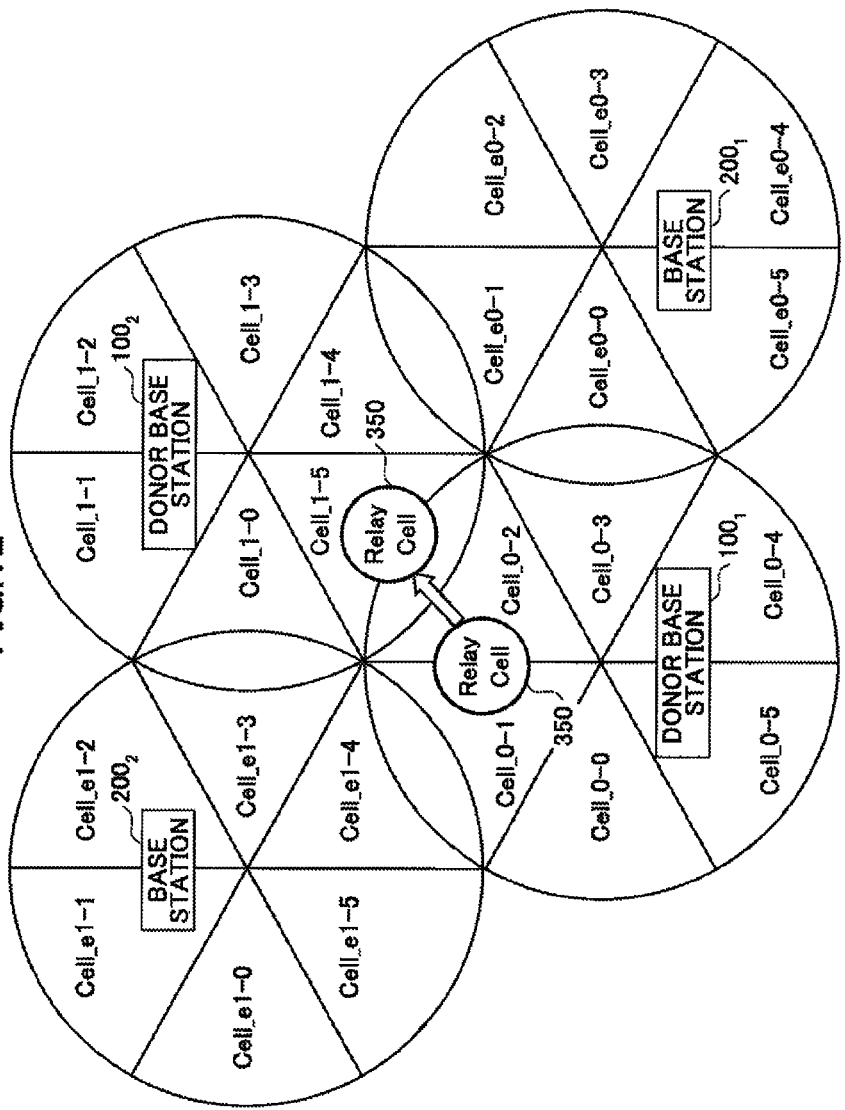
FIG. 12 illustrates another exemplary handover of the relay node of the embodiment.

FIG. 12 illustrates an operation of the wireless communication system, e.g., another exemplary handover of the relay node of the embodiment.

Referring to FIG. 12, the relay node 300 is handed over from Cell_0-2 belonging to the donor base station $100_1$ to $Cell_{13}$ 1-5 belonging to the donor base station $100_2$.

The neighbour cell list corresponding to Cell_0-2 belonging to the donor base station $100_1$ at the handover source, i.e., on the source side, includes the following information.

Hereinafter, "Self DeNB" designates the donor base station $100_1$; "DeNB#1" designates the donor base station $100_2$; "eNB#0" designates the base station $200_1$; "eNB#1" designates the base station $200_2$; and "Relay" designates the relay node 300.

List Name: DeNB#0_Ncell_list#0-2
   Cell Indicate: Cell_0-2
   Self DeNB Ncell: Cell_0-0, Cell_0-1, Cell_0-3, Cell_0-4, Cell_0-5
   DeNB#1 Ncell: $Cell_{13}$ 1-0, $Cell_{13}$ 1-4, $Cell_{13}$ 1-5
   eNB#0 Ncell: Cell_e0-0, Cell_e0-1
   eNB#1 Ncell: Cell_e1-3, Cell_e1-4
   Relay Ncell: Cell_r0

The neighbour cell list corresponding to Cell_0-5 belonging to the donor base station $100_2$ at the handover destination, i.e., on the target side, includes the following information.

Hereinafter, "Self DeNB" designates the donor base station $100_2$; "DeNB#0" designates the donor base station $100_1$; "eNB#0" designates the base station $200_1$; "eNB#1" designates the base station $200_2$; and "Relay" designates the relay node 300.

List Name: DeNB#1_Ncell_list#1-5
   Cell Indicate: $Cell_{13}$ 1-5
   Self DeNB Ncell: $Cell_{13}$ 1-0, $Cell_{13}$ 1-1, $Cell_{13}$ 1-2, $Cell_{13}$ 1-3, $Cell_{13}$ 1-4
   DeNB#0 Ncell: Cell_0-1, Cell_0-2, Cell_0-3
   eNB#0 Ncell: Cell_e0-0, Cell_e0-1
   eNB#1 Ncell: Cell_e1-3, Cell_e1-4
   Relay Ncell: Cell_r0

FIG. 13 illustrates an embodiment of the wireless communication system. Referring to FIG. 13, the relay node 300 is handed over from Cell_0-2 belonging to the donor base station $100_1$ to $Cell_{13}$ 1-5 belonging to the donor base station $100_2$.

A process of handing the relay node 300 over from the donor base station $100_1$ to the donor base station $100_2$ is started in step S1302. Said differently, a process of handing the relay node 300 over from the CPU 1062 of the donor base station $100_1$ to the CPU 1062 of the donor base station $100_2$ is started. Said differently, a process of handing the relay node 300 over between the CPU 1070 of the donor base station $100_1$ and the CPU 1070 of the donor base station $100_2$ is started.

The donor base station $100_1$ recognizes that the handover destination of the relay node 300 is the donor base station $100_2$ in step S1304. Said differently, the CPU 1062 of the donor base station $100_1$ recognizes that the handover destination of the relay node 300 is the donor base station $100_2$.

The donor base station $100_1$ reports the neighbour cell list corresponding to Cell_0-2 belonging to the donor base station $100_1$ to the donor base station $100_2$ in step S1306. Said differently, the CPU $1062$ of the donor base station $100_1$ reports the neighbour cell list corresponding to Cell_0-2 belonging to the donor base station $100_1$ to the donor base station $100_2$. The neighbour cell list corresponding to Cell_0-2 is input in the transmission line interface $102$ via the L2SW $104$. The transmission line interface $102$ reports the neighbour cell list corresponding to Cell_0-2 to the donor base station $100_2$.

The donor base station $100_2$ recognizes that the handover source of the relay node $300$ is the donor base station $100_1$ in step S$1308$. Said differently, the CPU $1062$ of the donor base station $100_2$ recognizes that the handover source of the relay node $300$ is the donor base station $100_1$.

The donor base station $100_2$ reports the neighbour cell list corresponding to Cell$_{13}$ 1-5 belonging to the donor base station $100_2$ to the donor base station $100_1$ in step S$1310$. Said differently, the CPU $1062$ of the donor base station $100_2$ reports the neighbour cell list corresponding to Cell$_{13}$ 1-5 belonging to the donor base station $100_2$ to the donor base station $100_1$. The neighbour cell list corresponding to Cell$_{13}$ 1-5 is input in the transmission line interface $102$ via the L2SW $104$. The transmission line interface $102$ reports the neighbour cell list corresponding to Cell$_{13}$ 1-5 to the donor base station $100_1$.

The donor base station $100_1$ extracts information indicative of a non-overlapping cell by comparing information of the cell contained in the neighbour cell list corresponding to Cell_0-2 belonging to the donor base station $100_1$ with information of the cell contained in the neighbour cell list reported in step S$1310$ from the donor base station $100_2$ in step S$1312$. Said differently, the CPU $1062$ of the donor base station $100_1$ extracts information indicative of the non-overlapping cell by comparing the information of the cell contained in the neighbour cell list corresponding to Cell_0-2 belonging to the donor base station $100_1$ with the information of the cell contained in the neighbour cell list reported from the donor base station $100_2$. Here, Cell$_{13}$ 1-5 at the handover destination may be removed from the information indicative of the non-overlapping cell.

The donor base station $100_2$ extracts information indicative of a non-overlapping cell by comparing information of the cell contained in the neighbour cell list corresponding to Cell$_{13}$ 1-5 belonging to the donor base station $100_2$ with information of the cell contained in the neighbour cell list reported in step S$1306$ from the donor base station $100_1$ in step S$1314$. Said differently, the CPU $1062$ of the donor base station $100_2$ extracts information indicative of the non-overlapping cell by comparing the information of the cell contained in the neighbour cell list corresponding to Cell$_{13}$ 1-5 belonging to the donor base station $100_2$ with the information of the cell contained in the neighbour cell list reported from the donor base station $100_1$. Here, Cell_0-2 at the handover source may be removed from the information indicative of the non-overlapping cell.

The donor base station $100_1$ instructs the donor base stations $100_1$ and $100_2$ and the base stations $200_1$ and $200_2$ accommodating the cell extracted as the non-overlapping cell in step S$1312$ to delete the cell belonging to the relay node $300$ from the neighbour cell lists in step S$1316$. Said differently, the CPU $1062$ of the donor base station $100_1$ instructs the donor base stations $100_1$ and $100_2$ and the base stations $200_1$ and $200_2$ accommodating the cell extracted as the non-overlapping cell in step S$1312$ to delete the cell belonging to the relay node $300$ from the neighbour cell lists. At this time, since the cell at the handover destination is omitted, the cell at the handover destination is not deleted. Referring to FIG. 12, because there isn't a non-overlapping cell in the donor base station $100_2$ and the base stations $200_1$ and $200_2$, the neighbour cell list update information in which "0" is designated as the "deleting neighbour cell number" is sent to the donor base station $100_2$ and the base stations $200_1$ and $200_2$.

In conformity with the instruction of step S$1316$, the donor base station $100_2$ and the base stations $200_1$ and $200_2$ update the neighbour cell lists in steps S$1318$, S$1320$ and S$1322$. Said differently, in conformity with the instruction in step S$1316$, the CPU $2062$ of the base station $200_1$, the CPU $1062$ of the donor base station $100_2$ and the CPU $2062$ of the base station $200_2$ update the neighbour cell lists.

Further, the donor base station $100_1$ deletes the cell belonging to the relay node $300$ from the neighbour cell lists corresponding to Cell_0-0, Cell_0-4 and Cell_0-5, which belong to the donor base station $100_1$ in step S$1324$. Said differently, the CPU $1062$ of the donor base station $100_1$ deletes the cell belonging to the relay node $300$ from the neighbour cell lists corresponding to Cell_0-0, Cell_0-4 and Cell_0-5, which belong to the donor base station $100_1$. This is because Cell_0-0, Cell_0-4 and Cell_0-5 do not overlap in the donor base station $100_1$.

The donor base station $100_2$ instructs the donor base stations $100_1$ and $100_2$ and the base stations $200_1$ and $200_2$ accommodating the cell extracted as the non-overlapping cell in step S$1314$ to add the cell belonging to the relay node $300$ from the neighbour cell lists in step S$1326$. Said differently, the CPU $1062$ of the donor base station $100_2$ instructs the donor base stations $100_1$ and $100_2$ and the base stations $200_1$ and $200_2$ accommodating the cell extracted as the non-overlapping cell in step S$1314$ to add the cell belonging to the relay node $300$ to the neighbour cell lists. At this time, since the cell at the handover source is omitted, the cell at the handover source is not added. Referring to FIG. 12, because there isn't a non-overlapping cell in the donor base station $100_2$ and the base stations $200_1$ and $200_2$, the neighbour cell list update information in which "0" is designated as the "adding neighbour cell number" is sent to the donor base station $100_2$ and the base stations $200_1$ and $200_2$.

In conformity with the instruction of step S$1326$, the donor base station $100_1$ and the base stations $200_1$ and $200_2$ update the neighbour cell lists in steps S$1328$, S$1330$ and S$1332$. Said differently, in conformity with the instruction in step S$1326$, the CPU $2062$ of the base station $200_1$, the CPU $1062$ of the donor base station $100_1$ and the CPU $2062$ of the base station $200_2$ update the neighbour cell lists.

The donor base station $100_2$ adds the cell belonging to the relay node $300$ to the neighbour cell lists corresponding to Cell$_{13}$ 1-1, Cell$_{13}$ 1-2 and Cell$_{13}$ 1-3, which belong to the donor base station $100_2$ in step S$1334$. Said differently, the CPU $1062$ of the donor base station $100_2$ adds the cell belonging to the relay node $300$ to the neighbour cell lists corresponding to Cell$_{13}$ 1-1, Cell$_{13}$ 1-2 and Cell$_{13}$ 1-3, which belong to the donor base station $100_2$. This is because Cell$_{13}$ 1-1, Cell$_{13}$ 1-2 and Cell$_{13}$ 1-3 do not overlap in the donor base station $100_1$.

<Second Operation of the Wireless Communication System>

Referring to FIG. 12, the relay node $300$ is handed over from Cell_0-1 belonging to the donor base station $100_1$ to Cell$_{13}$ 1-5 belonging to the donor base station $100_2$.

The neighbour cell list corresponding to Cell_0-1 belonging to the donor base station $100_1$ at the handover source, i.e., on the source side, includes the following information.

"Self DeNB" designates the donor base station $100_1$, "DeNB#1" designates the donor base station $100_2$, "eNB#1" designates the base station $200_2$ and "Relay" designates the relay node $300$.

List Name: DeNB#0_Ncell_list#0-1
   Cell Indicate: Cell_0-1
   Self DeNB Ncell: Cell_0-0, Cell_0-2, Cell_0-3, Cell_0-4, Cell_0-5
   DeNB#1 Ncell: $Cell_{13}$ 1-0, $Cell_{13}$ 1-5
   eNB#1 Ncell: Cell_e1-3, Cell_e1-4, Cell_e1-5
   Relay Ncell: Cell_r0

The neighbour cell list corresponding to Cell_0-5 belonging to the donor base station $100_2$ at the handover destination, i.e., on the target side, includes the following information.

Hereinafter, "Self DeNB" designates the donor base station $100_2$; "DeNB#0" designates the donor base station $100_1$; "eNB#0" designates the base station $200_1$; "eNB#1" designates the base station $200_2$; and "Relay" designates the relay node 300.

List Name: DeNB#1_Ncell_list#1-5
   Cell Indicate: $Cell_{13}$ 1-5
   Self DeNB Ncell: $Cell_{13}$ 1-0, $Cell_{13}$ 1-1, $Cell_{13}$ 1-2, $Cell_{13}$ 1-3, $Cell_{13}$ 1-4
   DeNB#0 Ncell: Cell_0-1, Cell_0-2, Cell_0-3
   eNB#0 Ncell: Cell_e0-0, Cell_e0-1
   eNB#1 Ncell: Cell_e1-3, Cell_e1-4
   Relay Ncell: Cell_r0

FIG. 14 illustrates an embodiment of the wireless communication system. Referring to FIG. 14, the relay node 300 is handed over from Cell_0-1 belonging to the donor base station $100_1$ to $Cell_{13}$ 1-5 belonging to the donor base station $100_2$.

A process of handing the relay node 300 over from the donor base station $100_1$ to the donor base station $100_2$ is started in step S1402. Said differently, a process of handing the relay node 300 over from the CPU 1062 of the donor base station $100_1$ to the CPU 1062 of the donor base station $100_2$ is started. Said differently, a process of handing the relay node 300 over between the handover controlling unit 1070 of the donor base station $100_1$ and the handover controlling unit 1070 of the donor base station $100_2$ is started.

The donor base station $100_1$ recognizes that the handover destination of the relay node 300 is the donor base station $100_2$ in step S1304. Said differently, the CPU 1062 of the donor base station $100_1$ recognizes that the handover destination of the relay node 300 is the donor base station $100_2$.

The donor base station $100_1$ reports the neighbour cell list corresponding to Cell_0-1 belonging to the donor base station $100_1$ to the donor base station $100_2$ in step S1406. Said differently, the CPU 1062 of the donor base station $100_1$ reports the neighbour cell list corresponding to Cell_0-1 belonging to the donor base station $100_1$ to the donor base station $100_2$. The neighbour cell list corresponding to Cell_0-1 is input in the transmission line interface 102 via the L2SW 104. The transmission line interface 102 reports the neighbour cell list corresponding to Cell_0-1 to the donor base station $100_2$.

The donor base station $100_2$ recognizes that the handover source of the relay node 300 is the donor base station $100_1$ in step S1408. Said differently, the CPU 1062 of the donor base station $100_2$ recognizes that the handover source of the relay node 300 is the donor base station $100_1$.

The donor base station $100_2$ reports the neighbour cell list corresponding to $Cell_{13}$ 1-5 belonging to the donor base station $100_2$ to the donor base station $100_1$ in step S1410. Said differently, the CPU 1062 of the donor base station $100_2$ reports the neighbour cell list corresponding to $Cell_{13}$ 1-5 belonging to the donor base station $100_2$ to the donor base station $100_1$. The neighbour cell list corresponding to $Cell_{13}$ 1-5 is input in the transmission line interface 102 via the L2SW 104. The transmission line interface 102 reports the neighbour cell list corresponding to $Cell_{13}$ 1-5 to the donor base station $100_1$.

The donor base station $100_1$ extracts information indicative of a non-overlapping cell by comparing information of the cell contained in the neighbour cell list corresponding to Cell_0-1 belonging to the donor base station $100_1$ with information of the cell contained in the neighbour cell list reported in step S1410 from the donor base station $100_2$ in step S1412. Said differently, the CPU 1062 of the donor base station $100_1$ extracts information indicative of the non-overlapping cell by comparing the information of the cell contained in the neighbour cell list corresponding to Cell_0-1 belonging to the donor base station $100_1$ with the information of the cell contained in the neighbour cell list reported from the donor base station $100_2$. Here, $Cell_{13}$ 1-5 at the handover destination may be removed from the information indicative of the non-overlapping cell.

The donor base station $100_2$ extracts information indicative of a non-overlapping cell by comparing information of the cell contained in the neighbour cell list corresponding to $Cell_{13}$ 1-5 belonging to the donor base station $100_2$ with information of the cell contained in the neighbour cell list reported in step S1406 from the donor base station $100_1$ in step S1414. Said differently, the CPU 1062 of the donor base station $100_2$ extracts information indicative of the non-overlapping cell by comparing the information of the cell contained in the neighbour cell list corresponding to $Cell_{13}$ 1-5 belonging to the donor base station $100_2$ with the information of the cell contained in the neighbour cell list reported from the donor base station $100_1$ in step S1406. Here, Cell_0-1 at the handover source may be removed from the information indicative of the non-overlapping cell.

The donor base station $100_1$ instructs the donor base stations $100_1$ and $100_2$ and the base stations $200_1$ and $200_2$ accommodating the cell extracted as the non-overlapping cell in step S1412 to delete the cell belonging to the relay node 300 from the neighbour cell lists in step S1416. Said differently, the CPU 1062 of the donor base station $100_1$ instructs the donor base station $100_2$ and the base stations $200_1$ and $200_2$ accommodating the cell extracted as the non-overlapping cell in step S1412 to delete the cell belonging to the relay node 300 from the neighbour cell lists. At this time, since the cell at the handover destination is omitted, the cell at the handover destination is not deleted. Referring to FIG. 12, because there isn't a non-overlapping cell in the donor base station $100_2$, the neighbour cell list update information in which "0" is designated as the "deleting neighbour cell number" is sent to the donor base station $100_2$. Because Cell_e1-5 does not overlap for the base station $100_2$, neighbour cell list update information where "1" is designated as the "deleting neighbour cell number" and "Cell_e1-5" is designated as the "neighbour cell information" is sent to the base station $100_2$.

In conformity with the instruction of step S1416, the donor base station $100_2$ and the base station $200_2$ update the neighbour cell lists in steps S1418 and S1420. Said differently, in conformity with the instruction in step S1416, the CPU 1062 of the base station $100_2$ and the CPU 2062 of the base station $200_2$ update the neighbour cell lists.

Further, the donor base station $100_1$ to delete the cell belonging to the relay node 300 from the neighbour cell lists corresponding to Cell_0-0, Cell_0-4 and Cell_0-5, which belong to the donor base station $100_1$ in step S1422. Said differently, the CPU 1062 of the donor base station $100_1$ deletes the cell belonging to the relay node 300 from the neighbour cell lists corresponding to Cell_0-0, Cell_0-4 and Cell_0-5, which belong to the donor base station $100_1$. This is because Cell_0-0, Cell_0-4 and Cell_0-5 do not overlap in the donor base station $100_1$.

The donor base station $100_2$ instructs the donor base stations $100_1$ and $100_2$ and the base stations $200_1$ and $200_2$ accommodating the cell extracted as the non-overlapping cell in step S1414 to add the cell belonging to the relay node 300 to the neighbour cell lists in step S1424. Said differently, the CPU 1062 of the donor base station $100_2$ instructs the donor base stations $100_1$ and $100_2$ and the base stations $200_1$ and $200_2$ accommodating the cell extracted as the non-overlapping cell in step S1414 to add the cell belonging to the relay node 300 to the neighbour cell lists. At this time, since the cell at the handover source is omitted, the cell at the handover source is not added. Referring to FIG. 12, because there isn't a non-overlapping cell in the donor base station $100_1$ and the base station $200_2$, the neighbour cell list update information in which "0" is designated as the "adding neighbour cell number" is sent to the donor base station $100_1$ and the base station $200_2$. Because Cell_e0-0 and Cell_e0-1 do not overlap for the base station $100_1$, neighbour cell list update information where "2" is designated as the "adding neighbour cell number" and "Cell_e0-0" and "Cell_e0-1" are designated as the "neighbour cell list update information" is sent to the base station $100_1$.

In conformity with the instruction of step S1424, the donor base station $100_1$ and the base station $200_2$ update the neighbour cell lists in steps S1426, S1428 and S1430. Said differently, in conformity with the instruction in step S1424, the CPU 2062 of the base station $200_1$, the CPU 1062 of the donor base station $100_1$ and the CPU 2062 of the base station $200_2$ update the neighbour cell lists.

The donor base station $100_2$ adds the cell belonging to the relay node 300 to the neighbour cell lists corresponding to $Cell_{13}$ 1-1, $Cell_{13}$ 1-2, $Cell_{13}$ 1-3 and $Cell_{13}$ 1-4, which belong to the donor base station $100_2$ in step S1432. Said differently, the CPU 1062 of the donor base station $100_2$ adds the cell belonging to the relay node 300 to the neighbour cell lists corresponding to $Cell_{13}$ 1-1, $Cell_{13}$ 1-2, $Cell_{13}$ 1-3 and $Cell_{13}$ 1-4, which belong to the donor base station $100_2$. This is because $Cell_{13}$ 1-1, $Cell_{13}$ 1-2, $Cell_{13}$ 1-3 and $Cell_{13}$ 1-4 do not overlap in the donor base station $100_2$.

According to the embodiment, it is possible to make the cell adjacent to the cell at the handover source of the relay node and also adjacent to the cell at the handover destination of the relay node know at least a donor base station including a cell probably to be the cell adjacent to the cell belonging to the relay node or a base station including a cell probably to be adjacent to the cell belonging to the relay node.

Further, at least one of the donor base stations including the cell probably to be the neighbour cell of the cell belonging to the relay node or the base station including the cell probably to be the neighbour cell of the cell belonging to the relay node can optimize the neighbour cell list used for the handover of the relay node. Specifically, because it is possible to compare the information indicative of the cell contained in the neighbour cell list corresponding to the cell at the handover source with the information indicative of the cell contained in the neighbour cell list corresponding to the cell at the handover destination, the overlapping cell can be detected. Therefore, it is possible to efficiently update the neighbour cell list used for handing over the relay node.

Within the embodiment, it is possible to efficiently perform a process of updating a neighbour cell list which is to be updated in handover of the relay node.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority or inferiority of the invention. Although the embodiment of the present invention has been described in detail, it should be understood that various changes, substitutions, and alterations could be made thereto without departing from the spirit and scope of the invention.

What is claimed is:

1. A base station, which is capable of communicating with a relay node, the base station comprising:
   a control unit configured, at a time of handing over the relay node from a first cell of a plurality of cells serviced by the base station to a second cell of a plurality of cells serviced by a second base station,
   to compare a source neighbour cell list of the first cell to a destination neighbour cell list of the second cell,
   to identify a non-overlapping cell, the non-overlapping cell being a cell that is not in common between the source neighbour cell list and the destination neighbour cell list, each neighbor cell list including adjacent cell information of a respective cell, and
   to update a neighbour cell list provided for the identified non-overlapping cell by deleting a relay node cell belonging to the relay node from the neighbour cell list provided for the non-overlapping cell,
   wherein the control unit is configured, at a time of the relay node being handed over from a third cell belonging to the second base station to a fourth cell belonging to the base station,
   to compare a source neighbour cell list of the third cell to a destination neighbour cell list of the fourth cell,
   to identify a second non-overlapping cell, the second non-overlapping cell being a cell that is not in common between the source neighbour cell list of the third cell and the destination neighbour cell list of the fourth cell, and
   to update a neighbour cell list corresponding to the second non-overlapping cell by adding the relay node cell to the neighbour cell list corresponding to the second non-overlapping cell.

2. The base station according to claim 1, further comprising:
   a transmission line interface configured to communicate with the second base station and a third base station, wherein the third base station is instructed update a neighbour list of a non-overlapping cell serviced by the third base station in response to the handover.

3. A communication method for a base station, which is capable of communicating with a relay node, the method comprising:
   at a time of handing over the relay node from a first cell of a plurality of cells serviced by the base station to a second cell of a plurality of cells serviced by a second base station,
   comparing a source neighbor cell list of the first cell to a destination neighbor cell list of the second cell;
   identifying a non-overlapping cell, the non-overlapping cell being a cell that is not in common between the source neighbor list and the destination neighbour cell list, each neighbor cell list including adjacent cell information of a respective cell; and
   updating a neighbour cell list provided for the identified non-overlapping cell by deleting the relay node cell from the neighbour cell list provided for the non-overlapping cell, wherein at a time of the relay node being handed over from a third cell belonging to the second base station to a fourth cell belonging to the base station, comparing a source neighbour cell list of the third cell to a destination neighbour cell list of the fourth cell, identifying a second non-overlapping cell, the second non-overlapping cell being a cell that is not in common between the source neighbour cell list of the third cell and the destination neighbour cell list of the fourth cell, and updating a neighbour cell list corresponding to the second non-overlapping cell by adding the relay node cell to the neighbour cell list corresponding to the second non-overlapping cell.

4. A wireless communication system including a relay node to which a relay node cell belongs, a first base station, a second base station and a third base station, wherein the first base station includes:

a first control unit configured, at a time of handing over the relay node from a first cell of a plurality of cells serviced by the first base station to a second cell of a plurality of cells serviced by the second base station, to compare a source neighbor cell list of the first cell to a destination neighbor cell list of the second cell, to identify a first non-overlapping cell, the first non-overlapping cell being a cell that is not in common between the source neighbor cell list and the destination neighbor cell list, each neighbor cell list including adjacent cell information of a respective cell, and to update a first neighbour cell list provided for the first non-overlapping cell by deleting the relay node cell from the first neighbour cell list provided for the first non-overlapping cell, and wherein the second base station includes:

a second control unit configured, at the time of handing over the relay node from the first cell to the second cell, to identify a second non-overlapping cell, the second non-overlapping cell being a cell that is not in common between the source neighbor cell list and the destination neighbor cell list and is serviced by the second base station, to update a neighbour cell list provided for the second non-overlapping cell by adding the relay node cell to the neighbour cell list provided for the second non-overlapping cell.

5. The base station according to claim 1, wherein the control unit adds the relay node cell to the neighbour cell list corresponding to the second non-overlapping cell upon receipt of a signal of requesting to add the relay node cell sent from the second base station.

6. The base station according to claim 1, wherein the control unit is configured, at the time of handing over the relay node, to report a third neighbour cell list containing information of the neighbour cell adjacent to the first cell.

* * * * *